United States Patent
Iyer et al.

(10) Patent No.: US 10,734,797 B2
(45) Date of Patent: Aug. 4, 2020

(54) COVER ASSEMBLIES FOR CABLES AND ELECTRICAL CONNECTIONS AND PRE-EXPANDED UNITS AND METHODS INCLUDING SAME

(71) Applicant: TE Connectivity Corporation, Berwyn, PA (US)

(72) Inventors: Ganpathy Iyer, Cary, NC (US); Edward O'Sullivan, Cary, NC (US); Mahmoud Seraj, Apex, NC (US); John A. Newman, Garner, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 282 days.

(21) Appl. No.: 15/819,928

(22) Filed: Nov. 21, 2017

(65) Prior Publication Data
US 2018/0145495 A1 May 24, 2018

Related U.S. Application Data

(60) Provisional application No. 62/425,345, filed on Nov. 22, 2016.

(51) Int. Cl.
*H01R 43/00* (2006.01)
*H02G 15/18* (2006.01)
(Continued)

(52) U.S. Cl.
CPC ............. *H02G 15/18* (2013.01); *H01B 3/441* (2013.01); *H02G 1/14* (2013.01);
(Continued)

(58) Field of Classification Search
CPC ........ H01B 3/441; H02G 1/14; H02G 15/064; H02G 15/18; H02G 15/1826; H02G 15/184
See application file for complete search history.

(56) References Cited

U.S. PATENT DOCUMENTS 3,163,707 A 12/1964 Darling
3,475,719 A 10/1969 Welling et al.
(Continued)

FOREIGN PATENT DOCUMENTS

| DE | 102007013332 | 9/2008 |
|---|---|---|
| EP | 0947038 | 10/2001 |
| WO | 2013/096145 | 6/2013 |

OTHER PUBLICATIONS

"CSJA In-line Cold Shrinkable Joints for 1/C Shielded Power Cables (15-35kV)" Tyco Electronics (2 pages) (2006/2007).
(Continued)

*Primary Examiner* — Paul D Kim
(74) *Attorney, Agent, or Firm* — Myers Bigel, P.A.

(57) ABSTRACT

A pre-expanded cover assembly unit for covering an electrical connection between first and second cables includes a cover assembly in a folded state including an elastomeric outer sleeve defining a cable passage to receive the electrical connection. The outer sleeve includes an intermediate section and first and second outer sections. The first outer section is folded at a first annular fold and is on the intermediate section and/or the second outer section. The cover assembly includes a first retention layer between the intermediate section and the first outer section. The cover assembly includes a first friction reducing layer between the first retention layer and the first outer section. The cover assembly unit includes a removable holdout mounted within the outer sleeve. The cover assembly is movable from a folded state to an unfolded state by sliding the first outer section in a first axial direction away from the intermediate section.

22 Claims, 22 Drawing Sheets

(51) Int. Cl.
*H01B 3/44* (2006.01)
*H02G 1/14* (2006.01)
*H02G 15/184* (2006.01)
*H02G 15/064* (2006.01)

(52) U.S. Cl.
CPC ....... *H02G 15/1826* (2013.01); *H02G 15/064* (2013.01); *H02G 15/184* (2013.01)

(56) References Cited

U.S. PATENT DOCUMENTS

| | | | |
|---|---|---|---|
| 3,816,640 A | 6/1974 | Varner | |
| 3,824,331 A * | 7/1974 | Mixon, Jr. | F16L 21/005 174/135 |
| 4,424,410 A | 1/1984 | Edgerton | |
| 4,601,529 A | 7/1986 | Billet | |
| 5,051,733 A | 9/1991 | Neuhouser | |
| 5,233,363 A | 8/1993 | Yarsunas et al. | |
| 5,286,220 A | 2/1994 | Watson | |
| 5,315,063 A | 5/1994 | Auclair | |
| 5,577,926 A | 11/1996 | Cox | |
| 5,740,583 A | 4/1998 | Shimada et al. | |
| 5,753,861 A | 5/1998 | Hansen et al. | |
| 5,844,170 A | 12/1998 | Chor et al. | |
| 6,025,560 A | 2/2000 | De Buyst et al. | |
| 6,040,527 A | 3/2000 | De Buyst et al. | |
| 6,245,999 B1 * | 6/2001 | Costigan | B29C 61/065 174/74 A |
| 6,364,677 B1 | 4/2002 | Nysveen et al. | |
| 7,182,617 B1 | 2/2007 | Cairns et al. | |
| 7,264,494 B2 | 9/2007 | Kennedy et al. | |
| 7,476,114 B1 | 1/2009 | Contreras | |
| 7,498,515 B2 | 3/2009 | Cardinaels et al. | |
| 7,728,227 B2 | 6/2010 | Portas et al. | |
| 7,858,883 B2 | 12/2010 | Seraj et al. | |
| 7,872,197 B2 | 1/2011 | Vallauri et al. | |
| 7,901,243 B1 | 3/2011 | Yaworski | |
| 8,030,570 B2 | 10/2011 | Seraj et al. | |
| 8,205,911 B2 | 6/2012 | Cordes et al. | |
| 8,445,783 B2 | 5/2013 | Taylor et al. | |
| 9,202,612 B2 | 12/2015 | Hernandez et al. | |
| 9,224,522 B2 | 12/2015 | Yaworski et al. | |
| 9,425,605 B2 * | 8/2016 | Yaworski | H02G 15/08 |
| 9,504,195 B2 * | 11/2016 | Dinu | H02G 15/1833 |
| 9,780,549 B2 * | 10/2017 | Yaworski | H02G 15/08 |
| 2004/0209025 A1 | 10/2004 | Kobayashi et al. | |
| 2005/0269124 A1 | 12/2005 | Suzuki et al. | |
| 2007/0293087 A1 | 12/2007 | Kennedy et al. | |
| 2008/0143097 A1 | 6/2008 | Canale | |
| 2009/0181583 A1 | 7/2009 | Krabs et al. | |
| 2010/0012350 A1 | 1/2010 | Hardi et al. | |
| 2010/0279542 A1 | 11/2010 | Seraj et al. | |
| 2014/0076627 A1 | 3/2014 | Maher | |
| 2017/0310093 A1 | 10/2017 | Chuang | |
| 2017/0317481 A1 | 11/2017 | O'Sullivan et al. | |

OTHER PUBLICATIONS

"CSJA Cold Shrinkable 'All-In-One' Straight Joint for Polymeric Insulated Cables Up to 42 kV" Tyco Electronics EPP 1348 (4 pages) (Jul. 2007).
"QS-III 5513A, 5514A, 5515A and 5516A 15 kV Cold Shrink Inline Splice Kits", Data Sheet, 3M Company, © 3M 2002, 6 pages.
International Search Report and Written Opinion for PCT/US2017/062818 dated Feb. 9, 2018, 12 pages.
International Preliminary Report on Patentability for PCT/US2017/062818 dated Jun. 6, 2019, 9 pages.

* cited by examiner

COVER ASSEMBLIES FOR CABLES AND ELECTRICAL CONNECTIONS AND PRE-EXPANDED UNITS AND METHODS INCLUDING SAME

RELATED APPLICATIONS

This application claims priority from U.S. Provisional Application No. 62/425,345, filed Nov. 22, 2016, the disclosure of which is incorporated by reference in its entirety.

FIELD OF THE INVENTION

The present invention relates to electrical cables and connections and, more particularly, to protective covers for electrical cables and electrical connections.

BACKGROUND OF THE INVENTION

Cold shrinkable covers are commonly employed to protect or shield electrical power cables and connections (e.g., low voltage cables up to about 1000 V and medium voltage cables up to about 46 kV). Examples of cold shrinkable covers for use with electrical power cables and connections include the "All-in-One" CSJA Cold Shrinkable joint, available from TE Connectivity. This product includes a splice body that is positioned over the connector and installed by releasing a holdout from the splice body. The splice body includes a re-jacketing sleeve that is unfolded and slid axially onto the jackets of the connected cables. However, such unfolding and sliding can be difficult for the operator in some instances.

SUMMARY OF THE INVENTION

Some embodiments of the present invention are directed to an integral, unitary pre-expanded cover assembly unit for covering an electrical connection between first and second electrical cables each having a primary conductor and a neutral conductor includes a cover assembly and a removable holdout. The cover assembly includes an elastomeric outer sleeve defining a cable passage to receive the electrical connection and the primary conductors of the first and second cables. The outer sleeve includes an intermediate section and first and second outer sections. With the cover assembly in a folded state or position, the first outer section is folded at a first annular fold and is on the intermediate section. With the cover assembly in the folded state or position, the second outer section is folded at a second annular fold and is on the first outer section. With the cover assembly in the folded state or position, the cover assembly includes: a first retention layer between the intermediate section and the first outer section of the outer sleeve; a first friction reducing layer between the first retention layer and the first outer section of the outer sleeve; a second retention layer between the first outer section and the second outer section of the outer sleeve; and a second friction reducing layer between the second retention layer and the second outer section of the outer sleeve. The holdout is mounted within outer sleeve. The holdout is operative to temporarily maintain the outer sleeve in an expanded state. The cover assembly is movable from the folded position or state to an unfolded position or state by sliding the second outer section of the outer sleeve in a first axial direction away from the intermediate section of the outer sleeve and by sliding the first outer section of the outer sleeve in a second, opposite axial direction away from the intermediate section of the outer sleeve.

Some other embodiments of the present invention are directed a method for forming a cover assembly. The method includes: installing a first mesh vinyl tube around an elastomeric tube having first and second opposite ends; installing a first polyethylene tube around the first mesh vinyl tube; and pulling the first end of the elastomeric tube over the first mesh vinyl tube and the first polyethylene tube such that an outer surface of the elastomeric tube faces the first mesh vinyl tube and the first polyethylene tube and such that a portion of the first polyethylene tube extends past the first end of the elastomeric tube toward the second end of the elastomeric tube.

Some other embodiments of the present invention are directed to an integral, unitary pre-expanded cover assembly unit for covering an electrical connection between first and second electrical cables each having a primary conductor. The cover assembly unit includes a cover assembly including an elastomeric outer sleeve defining a cable passage to receive the electrical connection and the primary conductors of the first and second cables. The outer sleeve includes an intermediate section and first and second end sections. In a folded position or state, the first end section is folded at a first annular fold and is on the intermediate section and/or the second outer section. In the folded position or state: a first retention layer between the intermediate section and the first outer section of the outer sleeve; and a first friction reducing layer between the first retention layer and the first outer section of the outer sleeve. The cover assembly unit includes a removable holdout mounted within the outer sleeve, wherein the holdout is operative to temporarily maintain the outer sleeve in an expanded state. The cover assembly is movable from the folded position or state to an unfolded position or state by sliding the first outer section of the outer sleeve in a first axial direction away from the intermediate section of the outer sleeve.

Some other embodiments of the invention are directed to a method for covering an electrical connection between first and second electrical cables each having a primary conductor. The method includes providing an integral, unitary pre-expanded cover assembly unit. The cover assembly unit includes: a cover assembly in a folded position or state including: an elastomeric outer sleeve defining a cable passage to receive the electrical connection and the primary conductors of the first and second cables, the outer sleeve including an intermediate section and first and second outer sections, wherein the first outer section is folded at a first annular fold and is on the intermediate section and/or the second outer section; a first retention layer between the intermediate section and the first outer section of the outer sleeve; and a first friction reducing layer between the first retention layer and the first outer section of the outer sleeve. The cover assembly unit includes a removable holdout mounted within the outer sleeve, wherein the holdout is operative to temporarily maintain the outer sleeve in an expanded state. The method includes receiving the cover assembly unit around the electrical connection. The method includes removing the holdout from the outer sleeve. The method includes sliding the first outer section of the outer sleeve in a first axial direction away from the intermediate section of the outer sleeve and onto the first cable and/or the cable connection.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
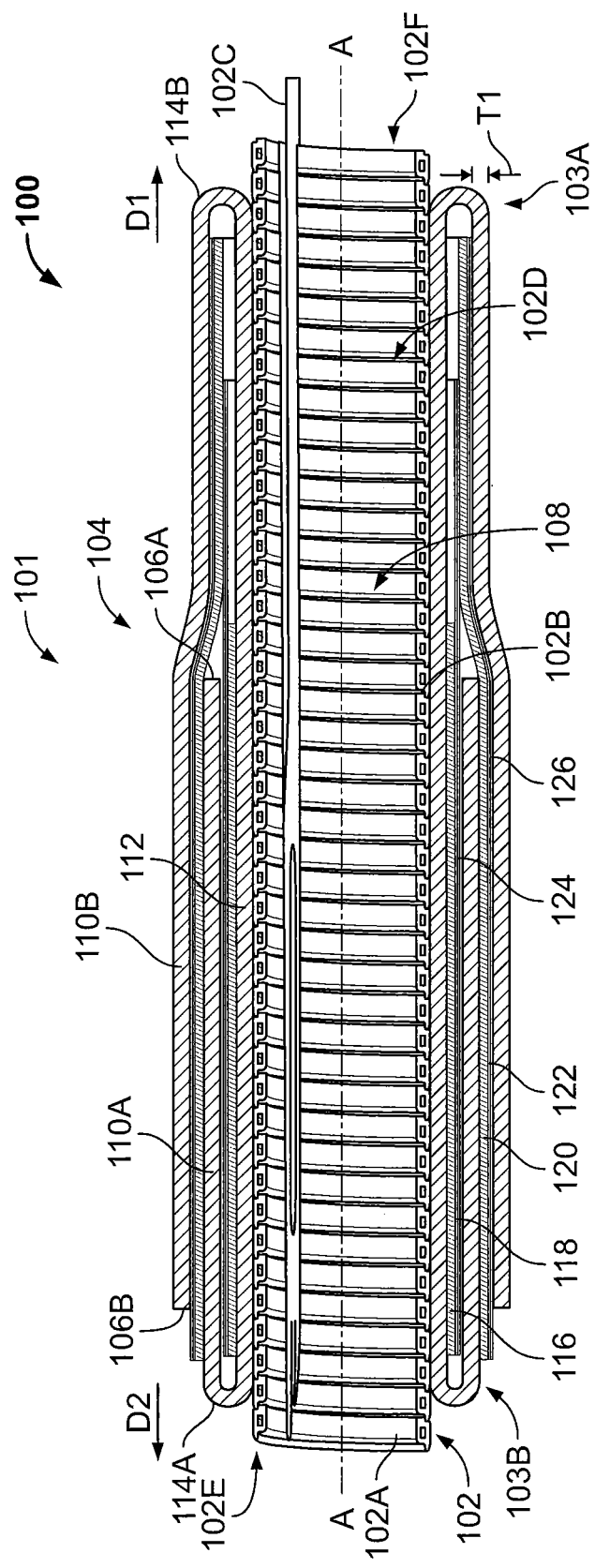
FIG. 1 is a cross-sectional view of a pre-expanded cover assembly unit including a cover assembly and a holdout device according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With reference to FIGS. 1-7, a cover assembly 100 according to some embodiments of the present invention is shown therein.

Figure 6:
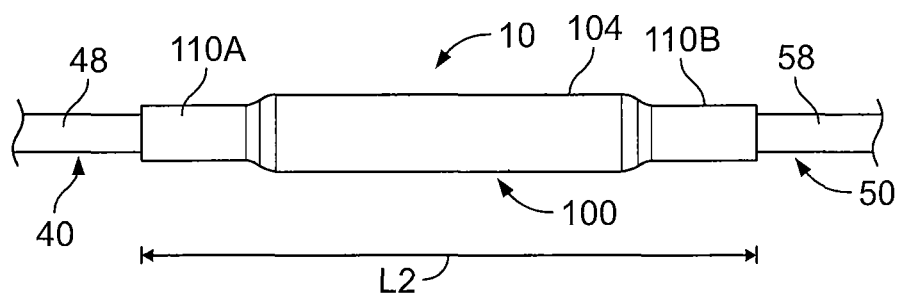
Figure 7:
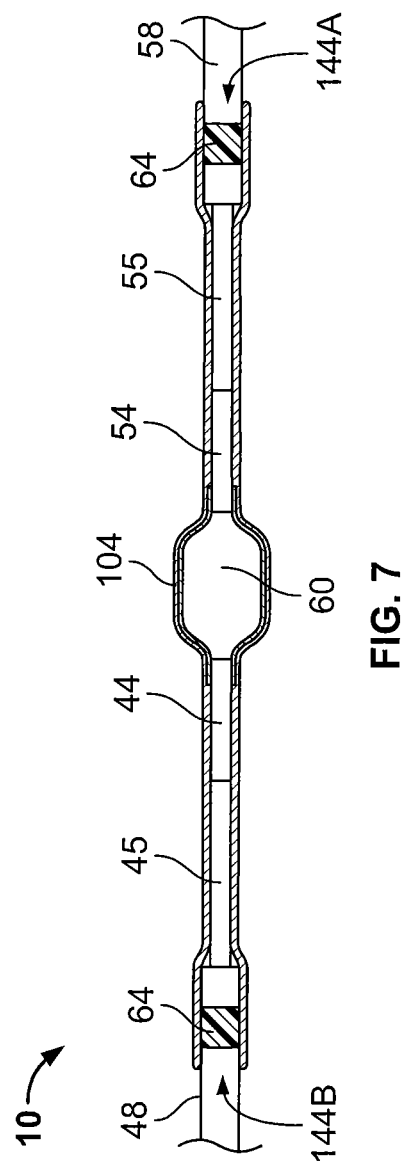
FIG. 7 is a cross-sectional view of the covered splice connection of FIG. 6.

The cover assembly 100 may be used to cover and electrically insulate electrical substrates such as cables and connectors. The cover assembly 100 may be provided as a pre-expanded cover assembly unit 101 including a holdout device 102, as shown in FIG. 1, wherein the cover assembly 100 is in an expanded state or position. The cover assembly 100 is shown in a folded position or state in FIG. 1. The cover assembly 100 may be deployed and mounted on the intended substrate in a retracted state or position as shown in FIGS. 6 and 7 and discussed in more detail below. The cover assembly 100 is shown in an unfolded position or state in FIGS. 6 and 7. According to some embodiments, the cover assembly 100 is a cold shrink cover, meaning that it can be shrunk or retracted about the substrate without requiring the use of applied heat.

Figure 2A:
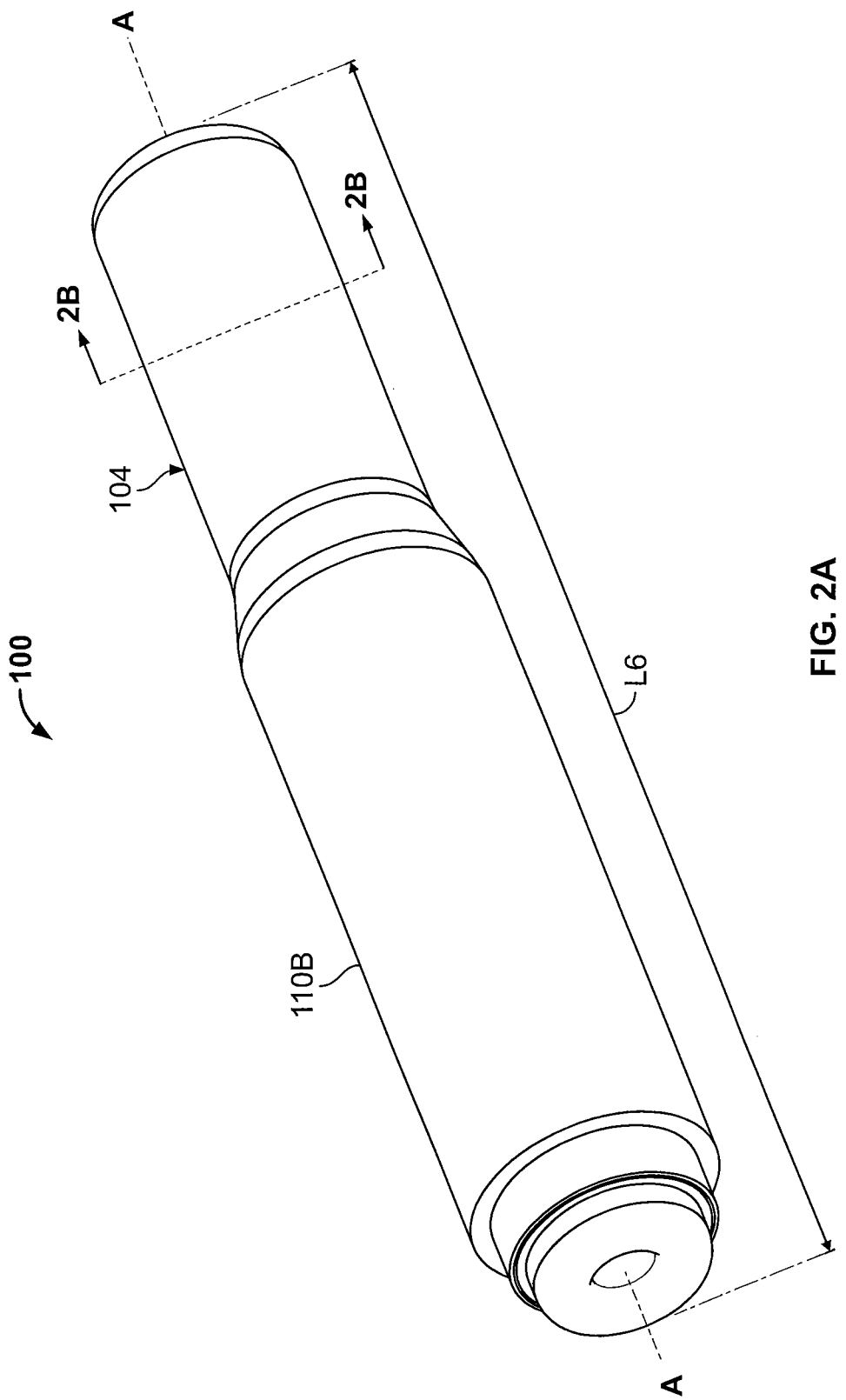
FIG. 2A is a perspective view of the cover assembly of FIG. 1 shown without the holdout device.
Figure 2B:
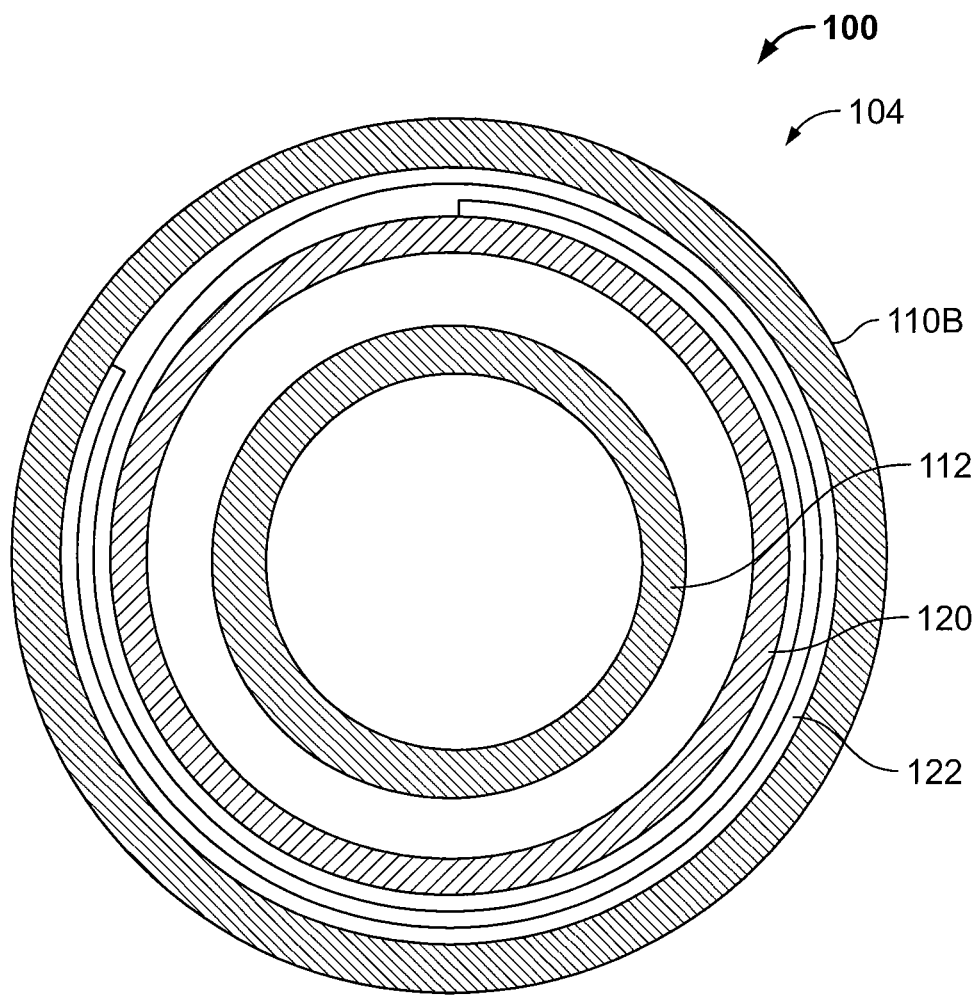
FIG. 2B is a cross-sectional view of the cover assembly of FIG. 2A taken along the line 2B-2B.

Referring to FIGS. 1, 2A and 2B, the cover assembly 100 has a lengthwise axis A-A. According to some embodiments, the cover assembly 100 is provided pre-installed and pre-expanded on the holdout 102. In the folded state or position shown in FIG. 1, the cover assembly 100 has first and second opposite ends 103A, 103B.

The cover assembly 100 may be used to cover and seal a connection or splice between two or more cables 40, 50 including a connector 60 to form a connection assembly 10 as shown in FIGS. 6 and 7. According to some embodiments, the cables 40, 50 are concentric neutral cables.

The cover assembly 100 includes an outer sleeve (or re-jacket) 104. The outer sleeve 104 has first and second opposed ends 106A, 106B (FIG. 1). The outer sleeve 104 is tubular and defines an axially extending conductor through passage 108 that communicates with opposed end openings 144A, 144B (FIG. 7). When mounted on the holdout 102 in the folded position or state as shown in FIG. 1, first and second outer sections 110A, 110B of the outer sleeve 104 are folded back on an intermediate section 112 of the outer sleeve 104 at annular folds 114A, 114B. More specifically, the first outer section 110A of the outer sleeve 104 may be folded back on the intermediate section 112 of the outer sleeve 104 at the annular fold 114A and the second outer section 110B of the outer sleeve 104 may be folded back on the first outer section 110A and the intermediate section 112 of the outer sleeve 104 at the annular fold 114B.

The cover assembly 100 includes a first retention layer 116 and a first friction reducing layer or tube (or first low friction layer or tube) 118 between the intermediate section 112 and the first outer section 110A of the outer sleeve 104. The cover assembly 100 includes a second retention layer 120 and a second friction reducing layer or tube (or second low friction layer or tube) 122 between the first and second outer sections 110A, 110B of the outer sleeve 104.

The first and second retention layers 116, 120 help to maintain or retain the flipped outer sleeve 104 in place during expansion. That is, the first and second retention layers 116, 120 help prevent the outer sleeve 104 from unrolling while it is expanded onto the holdout 102.

In some embodiments, a coefficient of friction between the friction reducing layers 118, 122 and the outer tube 104 is less than a coefficient of friction between the retention layers 116, 120 and the outer tube 104. In some embodiments, a coefficient of friction between the retention layers 116, 120 and the outer sleeve 104 is less than a coefficient of friction between overlapping layers of the outer sleeve 104.

The cover assembly 100 may include a first lubrication layer 124 between the first friction reducing layer 118 and the first outer section 110A of the outer sleeve 104. The cover assembly 100 may include a second lubrication layer 126 between the second friction reducing layer 122 and the second outer section 110B of the outer sleeve 104.

The outer sleeve 104 can be formed of any suitable material. According to some embodiments, the outer sleeve 104 is formed of an electrically insulative material. According to some embodiments, the outer sleeve 104 is formed of an elastically expandable material. According to some embodiments, the outer sleeve 104 is formed of an elastomeric material. According to some embodiments, the outer sleeve 104 is formed of ethylene propylene diene monomer (EPDM) rubber. Other suitable materials may include neoprene or other rubber. According to some embodiments, the outer sleeve 104 has a Modulus at 100 percent elongation (M100) in the range of from about 0.6 to 1.1 MPa. The outer sleeve 104 may be formed by any suitable method and apparatus. For example, the outer sleeve 104 may be extruded or molded.

According to some embodiments, the thickness T1 (FIG. 1) of the outer sleeve 104 is in the range of from about 0.030 to 0.31 inches. According to some embodiments, the length L2 (FIG. 6) of the outer sleeve 104 is in the range of from about 15 to 35 inches.

The first and second retention layers 116, 120 may be tubular sleeves. The retention layers 116, 120 may be formed of a polymeric material (e.g., vinyl) mesh.

The first and second friction reducing layers 118, 122 may be thin, pliable layers. The first and second friction reducing layers 118, 122 may be formed of a polymeric material such as polyethylene, Mylar™, polyester, or nylon. According to some embodiments, the first and second friction reducing members 118, 122 are tubes that are received around the first and second retention layers 116, 120, respectively. As described in more detail below, the first and second friction reducing layers 118, 122 may be in the form of a flexible tube that has an inner diameter or width that is greater than an outer diameter of the outer sleeve 104 and the corresponding retention layer 116, 120 received therearound. According to some embodiments, and as also described in more detail below, each friction reducing layer 118, 122 is in the form of a flexible tube and is wrapped around the outer sleeve 104 and the corresponding retention layer 116, 120 multiple times such that each friction reducing layer 118, 122 includes multiple wraps or overlapping or superimposed layer sections of friction reducing material such as polyethylene. In addition, each friction reducing layer 118, 122 may include multiple flexible tubes that are each wrapped around the outer sleeve 104 and the corresponding retention layer 116, 120 multiple times to provide an even greater number of layers of friction reducing material such as polyethylene. Each friction reducing layer 118, 122 may have thickness of between about 0.02 and 0.2 mm.

The first and second lubrication layers 124, 126 may be formed of any suitable flowable or viscous lubricant such as grease.

According to some embodiments, the first and second retention layers 116, 120 do not include fluid or lubricant. Therefore, the first and second retention layers 116, 120 may be "dry" meaning that only the material making up the first and second retention layers 116, 120 are between the outer sleeve 104 and the first and second friction reducing layers 118, 122. For example, the first and second retention layers 116, 120 may each only include a polymeric mesh layer.

According to some embodiments, the holdout 102 includes a flexible strip 102A helically wound to form a holdout body in the form of a rigid cylinder 102B defining a holdout passage 102D. The strip 102A includes a pull cord 102C extending from a distal end 102E of the cylinder 102B and through the passage 102D and beyond the proximal end 102F of the cylinder 102B.

The holdout device 102 may be factory installed. The holdout 102 can be formed of any suitable material. According to some embodiments, the holdout 102 is formed of a semi-rigid or rigid plastic. In some embodiments, the holdout 102 is formed of polypropylene, PVC or ABS.

Figure 3:
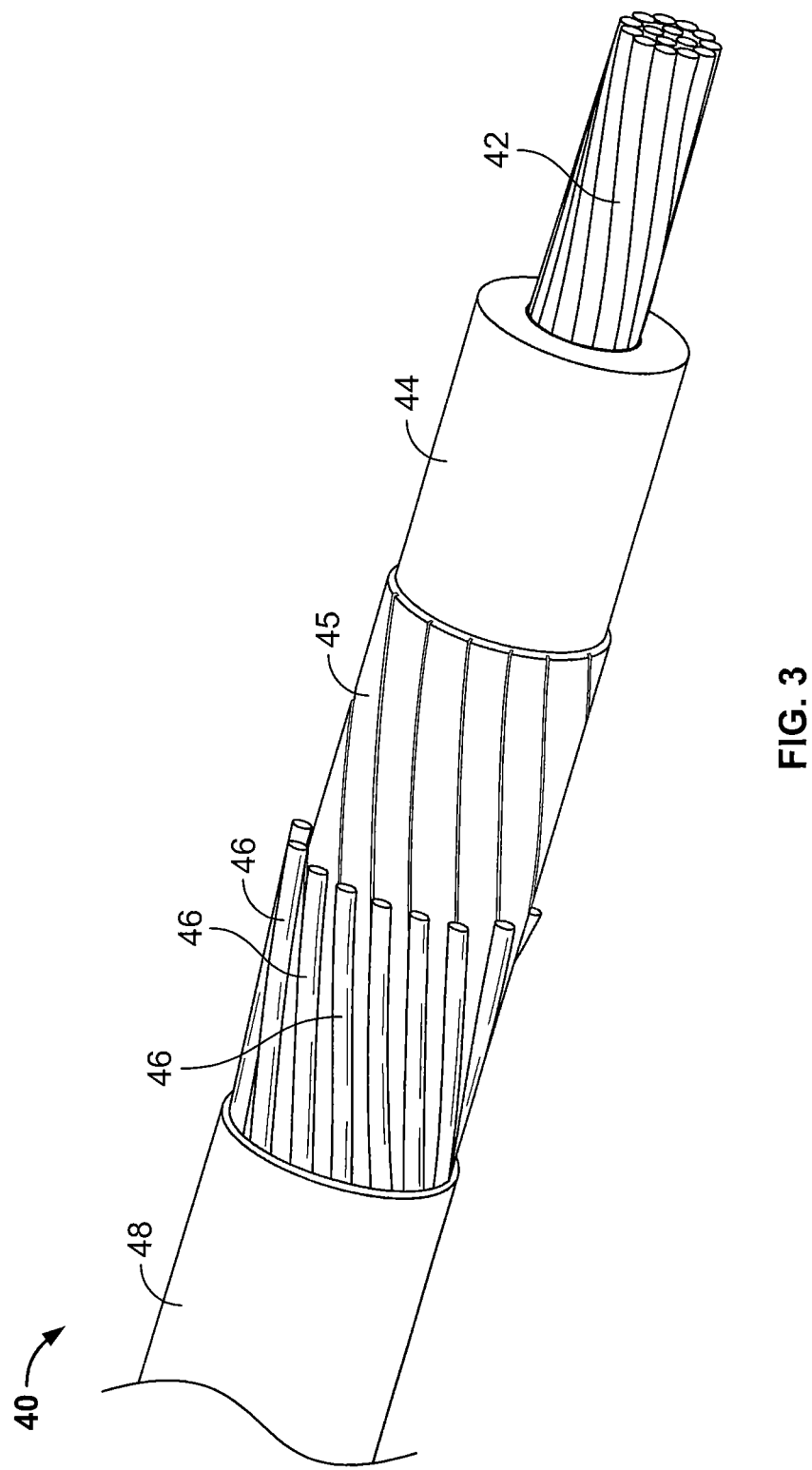
FIG. 3 is a perspective view of an exemplary concentric neutral cable.

Referring now to FIGS. 3-7, the pre-expanded unit 101 may be used in the following manner to apply the cover 100 over a splice connection 15 (FIG. 4) between a pair of electrical power transmission cables 40, 50 to form a connection assembly 10. According to some embodiments, the cables 40, 50 are low-voltage or medium-voltage (e.g., between about 5 and 46 kV) power transmission cables. As shown in FIG. 3, the cable 40 includes a primary electrical conductor 42, a polymeric insulation layer 44, a semiconductor layer 45, one or more neutral conductors 46, and a jacket 48, with each component being concentrically surrounded by the next. According to some embodiments and as shown, the neutral conductors 46 are individual wires, which may be helically wound about the semiconductor layer 45. The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The neutral conductors 46 may be formed of any suitable material such as copper. The jacket 48 may be formed of any suitable material such as EPDM. The cable 50 is similarly constructed with a primary electrical conductor 52, a polymeric insulation layer 54, a semiconductor layer 55, one or more neutral conductors 56, and a jacket 58 corresponding to components 42, 44, 45, 46 and 48, respectively.

The connection assembly 10 may be formed and the cover assembly 100 may be installed as follows. The cables 40, 50 are prepared as shown in FIG. 4 such that a segment of each layer extends beyond the next overlying layer.

Figure 4:
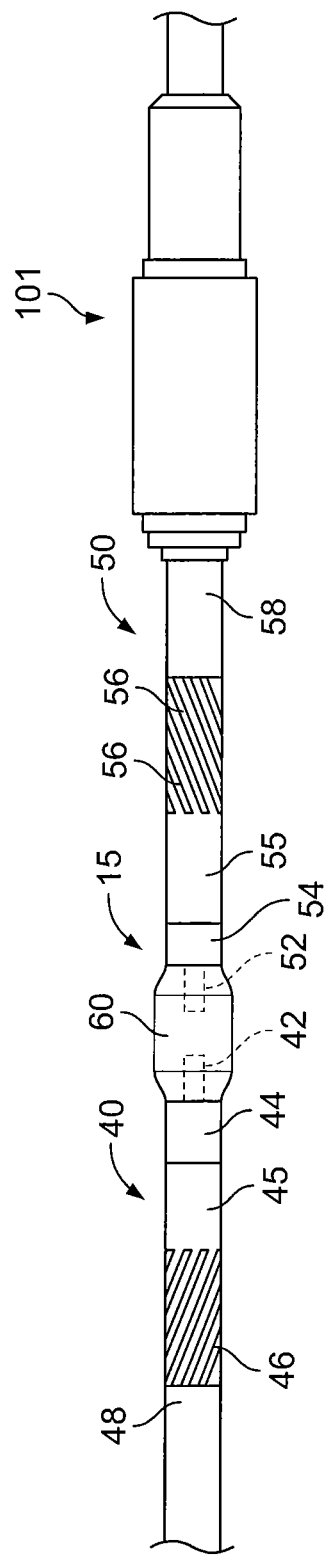
FIGS. 4-6 are side views illustrating procedures for installing the cover assembly unit of FIG. 1 on a pair of concentric neutral cables coupled by a connector to form a splice connection.

The pre-expanded unit 101 is slid over the cable 50 as shown in FIG. 4. According to some embodiments, the inside diameter of the holdout 102 is greater than the outer diameter of each cable 40, 50 such that the inner diameter of the holdout 102 is sufficient to receive the prepared cable 40, 50 and the connector 60 without undue effort. According to some embodiments, the inner diameter of the holdout 102 is at least as great as the outer diameter of the largest portion of the cables or connectors that are to be received in the passage 102D. The pre-expanded unit 101 may be retained or parked on the cable 50 until the operator is ready to install the cover assembly 100 on the cables 40, 50.

The electrical connector 60 is secured to each primary conductor 42, 52 to mechanically and electrically couple the primary conductors 42, 52 to one another as shown in FIG. 4. The connector 60 may be any suitable type of connector such as a metal crimp connector.

Figure 5:
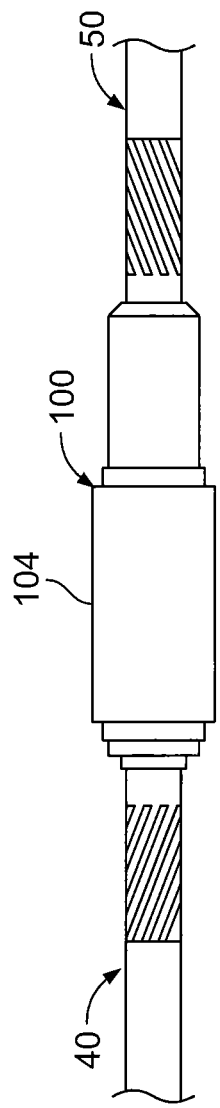

The pre-expanded unit 101 is then slid into position over the connector 60 as shown in FIG. 5. The holdout 102 is then removed from the cover assembly 100, thereby permitting the elastomeric sleeve 104 to relax and radially retract about the cables 40, 50 and the connector 60. According to some embodiments, the outer sleeve 104 overlaps and engages the semiconductor layers 44, 54 of the cables 40, 50.

More particularly, the holdout 102 is removed by pulling the pull cord 102C through the passage 102D (e.g., from the distal end 102E to the proximal end 102F). As a result, the strip 102A is progressively removed from the distal end 102E, causing the cylinder 102B to progressively disintegrate from the distal end 102E. This in turn permits the outer sleeve 104 to contract radially inwardly. This process is continued until the cylinder 102B is fully disintegrated and the strip 102A removed from the outer sleeve 104 as illustrated in FIGS. 6 and 7.

Strips of sealant 64 may be applied to the outer surfaces of the cable jackets 48, 58. The operator then rolls each of the extension or outer sections 110A, 110B of the outer sleeve 104 axially outwardly to cover the adjacent sections of the cables 40 and 50, respectively. According to some embodiments, at least a portion of each extension section 110A, 110B overlaps a respective portion of each cable jacket 48, 58 and engages the associated sealant strip 64 to provide a moisture seal. The cover assembly 100 is thereby fully installed to form the connection assembly 10 as shown in FIGS. 6 and 7.

More particularly, referring to FIGS. 1 and 6, the operator may unroll (slide) the second outer section 110B of the outer sleeve 104 axially outwardly in the axial direction D1 to cover an adjacent section of the cable 50. The operator may then unroll (slide) the first outer section 110A of the outer sleeve 104 axially outwardly in the opposite axial direction D2 to cover an adjacent section of the cable 40. The operator may then remove the friction reducing layers 118, 122 and the retention layers 116, 120 from the outer sleeve 104.

The relaxed inner diameter of the outer sleeve 104 is less than at least the outer diameter of the jacket layers 48, 58. Therefore, the outer sleeve 104 exerts a radially inwardly compressive or clamping force or pressure (due to elastic tension) onto the cables 40, 50. The outer sleeve 104 thereby effects a liquid tight seal at the interface between the cable jackets 48, 58 and the outer sleeve 104. This seal can protect the cable and the splice from the ingress of environmental moisture. According to some embodiments the relaxed inner diameter of the outer sleeve 104 is at least 10% less than the smallest diameter cable upon which the cover assembly 100 is intended to be installed.

Cover assemblies and methods of the present invention and as described herein can provide a number of advantages. Known cover assemblies or rubber jackets include a mesh tube and grease between the folded layers of the rubber in an effort to make it easier for an operator to unroll or slide open the jacket (e.g., to unroll one of the layers of rubber away from another layer of rubber with the mesh tube and the grease therebetween). However, the mesh has a tendency to dig into the rubber of the jacket and the grease tends to settle in the openings of the mesh. The grease may also be absorbed into the rubber. This is particularly the case when the jacket is handled frequently and/or is stored for a long period of time before use. The jacket becomes difficult to unroll when the mesh digs into the rubber, when the grease settles in the openings of the mesh, and/or when the grease is absorbed in the rubber. For example, layers of rubber of the outer sleeve may directly contact each other resulting in a high friction interface that makes it difficult or practically impossible to unroll or slide the jacket.

Embodiments of the present invention address these problems at least in part by providing the friction reducing layers 118, 122. The friction reducing layers 118, 122 provides a low friction surface which makes unrolling the cover assembly 100 easier than with known covers or jackets. For example, referring to FIG. 1, the second friction reducing layer 122 allows for easier sliding of the second outer section 110B of the outer sleeve 104 away from the first outer section 110A of the outer sleeve 104 in the direction D1. Also, the first friction reducing layer 118 allows for easier sliding of the first outer section 110A of the outer sleeve 104 away from the intermediate section 112 of the outer sleeve 104 in the direction D2. Therefore, the friction reducing layers 118, 122 facilitate easier sliding and help inhibit bonding. The grease layers 124, 126 may also facilitate easier unrolling of the cover assembly 100.

In addition, the friction reducing layers 118, 122 may be formed by thin, flexible tubes that are wrapped around the outer sleeve 104 and the corresponding retention layers 116, 120 multiple times. This can provide a more robust low friction surface that is less likely to fail by tearing (or if an upper layer or wrap tears, lower layers or wraps to maintain the low friction surface). The present inventors also found that wrapping the flexible tube multiple times around the sleeve and corresponding mesh tube results in the friction reducing layer having wrinkles which further reduce the friction and allows for easier unrolling.

As described above, the first and second retention layers 116, 120 help prevent the outer sleeve 104 from unrolling while it is expanded onto the holdout 102. In some embodiments, the retention layers 116, 120 can provide an intermediate friction surface were the friction reducing layers 118, 122 to fail. This may allow an operator to unroll or slide the cover assembly 100 in the event that the one or more of the friction reducing layers 118, 122 or portions thereof fail during unrolling, albeit using increased force.

FIG. 2 is a perspective view of the cover assembly 100 without the holdout. FIGS. 8-19 illustrate an example of a process of forming the cover assembly 100 of FIG. 2.

Figure 8:
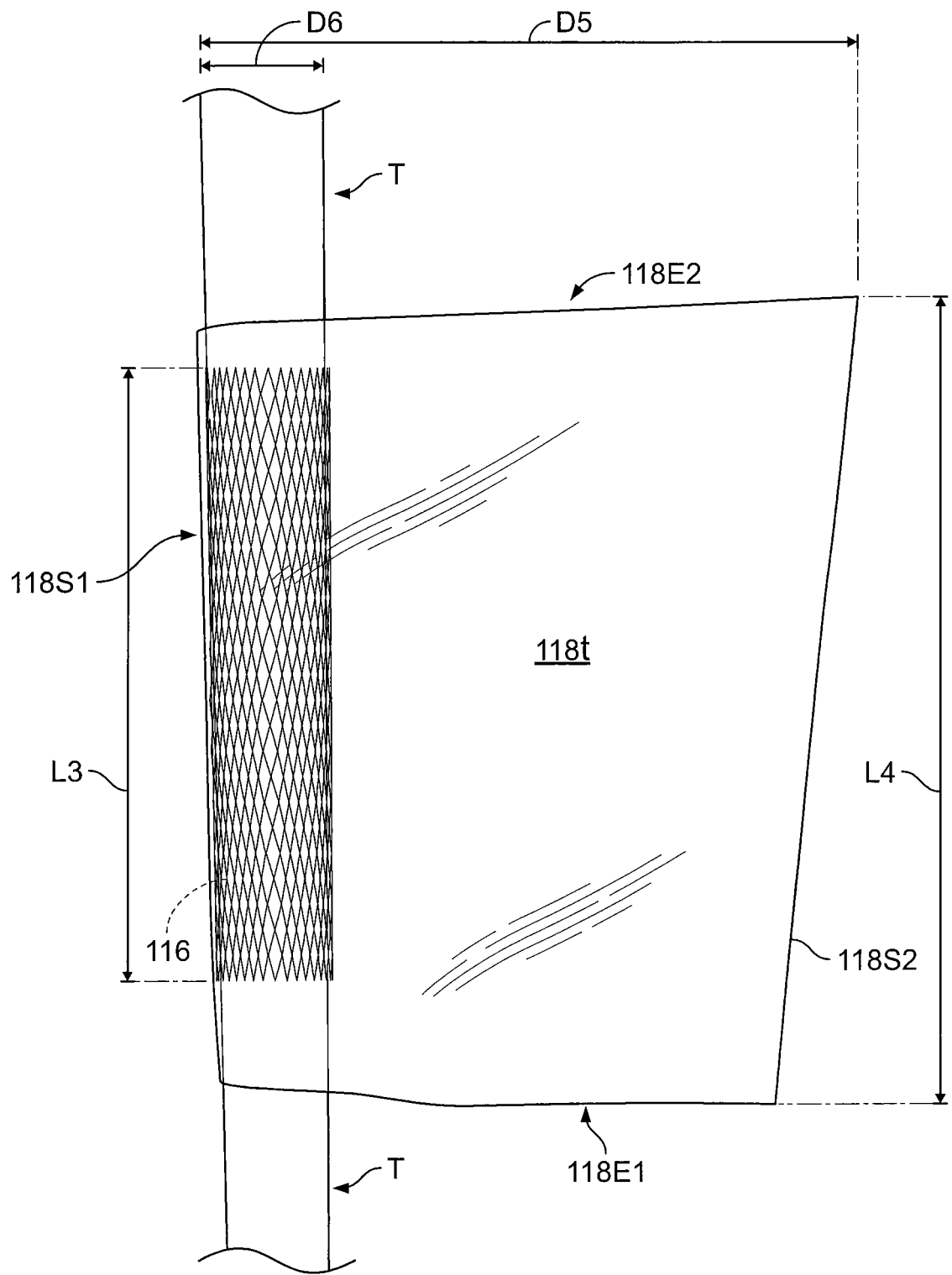
FIGS. 8-19 illustrate an example process for making the cover assembly of FIG. 2.
Figure 9:
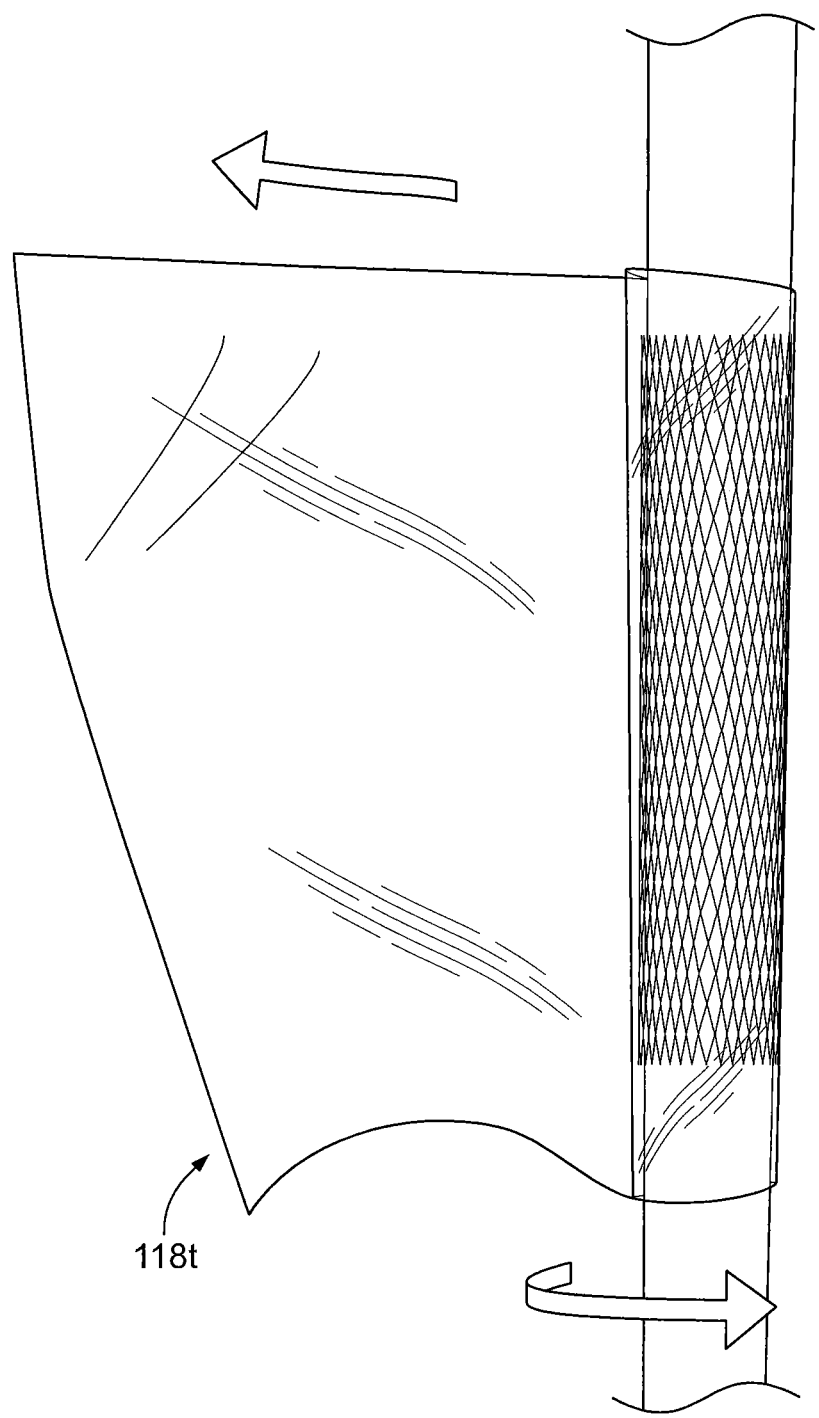

Referring to FIGS. 8 and 9, an elastomeric tube T may be positioned on a mandrel and clamped in a bench vise. The tube T may be formed of, for example, EPDM. The tube T ultimately forms the outer sleeve 104 of the cover assembly (FIG. 1).

A generally cylindrical mesh tube corresponding to the first retention layer 116 is received around the tube T. The mesh tube 116 may be at least partially held in place by friction. The mesh tube 116 may have a length L3 between about 50 and 300 mm and, in some embodiments, may have a length of about 150 mm.

Figure 10:
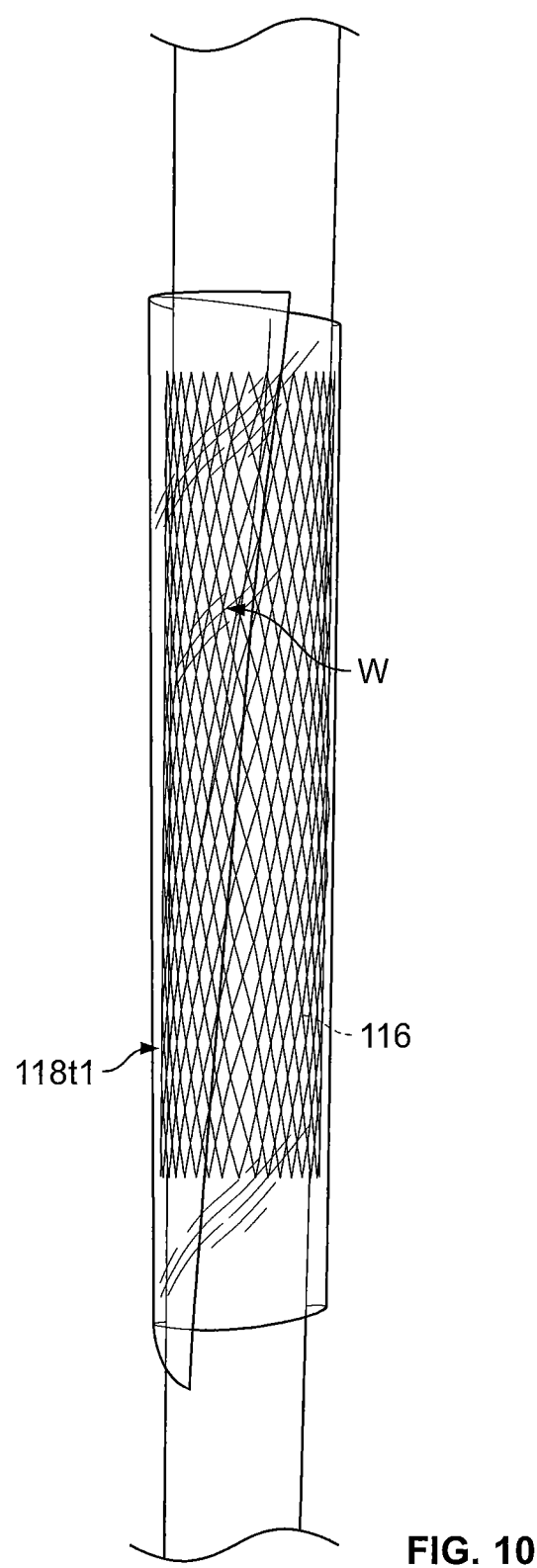

Referring to FIGS. 8-10, a first flexible tube 118*t* is positioned over the mesh tube 116 and pulled to one side. The first flexible tube 118*t* may be formed of, for example, polyethylene. The first flexible tube includes first and second opposite open ends 118E1, 118E2 and first and second opposite closed sides 118S1, 118S2. The mesh tube 116 is received in a passage of the first flexible tube 118*t* that is defined between the first and second open ends 118E1, 118E2. In the illustrated embodiment, the first flexible tube 118*t* has an inner diameter or width D5 that is substantially larger than an outer diameter D6 of the tube T (and/or the mesh tube 116). The width D5 may correspond to the distance between the first and second closed sides 118S1, 118S2. The diameter or width D5 of the first flexible tube 118*t* may be between about 100 and 300 mm and, in some embodiments, is about 200 mm. The outer diameter D6 of the tube T may be between about 40 and 60 mm and, in some embodiments, is about 50 mm.

The flexible tube 118*t* may have a circular cross section when expanded. Alternatively, the flexible tube 118*t* may have an elliptical or lens-shaped (e.g., pointed elliptical) cross section when expanded. For these alternative shapes, the "diameter" D5 of the flexible tube 118*t* refers to the length along the major axis of the shape.

As shown in FIGS. 8-10, the shape and relative large inner diameter of the flexible tube 118*t* allows the tube T and the mesh tube 116 to be received lengthwise along an inner surface of one of the sides 118S1, 118S2 of the flexible tube 118*t* and allows the opposite one of the sides 118S1, 118S2 of the tube 118*t* to be pulled away from the tube T such that the flexible tube 118*t* extends away from the tube T. The flexible tube 118*t* may then be wrapped around the mesh tube 116 and the tube T multiple times. As illustrated in FIG. 10, the flexible tube 118*t* includes wrinkles W when wrapped in this manner.

The flexible tube 118*t* may have a length L4 such that the first flexible tube extends past the mesh tube 116 toward the second end 106B of the tube T. The length L4 of the flexible tube 118*t* may be between about 100 and 300 mm and, in some embodiments, is about 200 mm.

Figure 11:
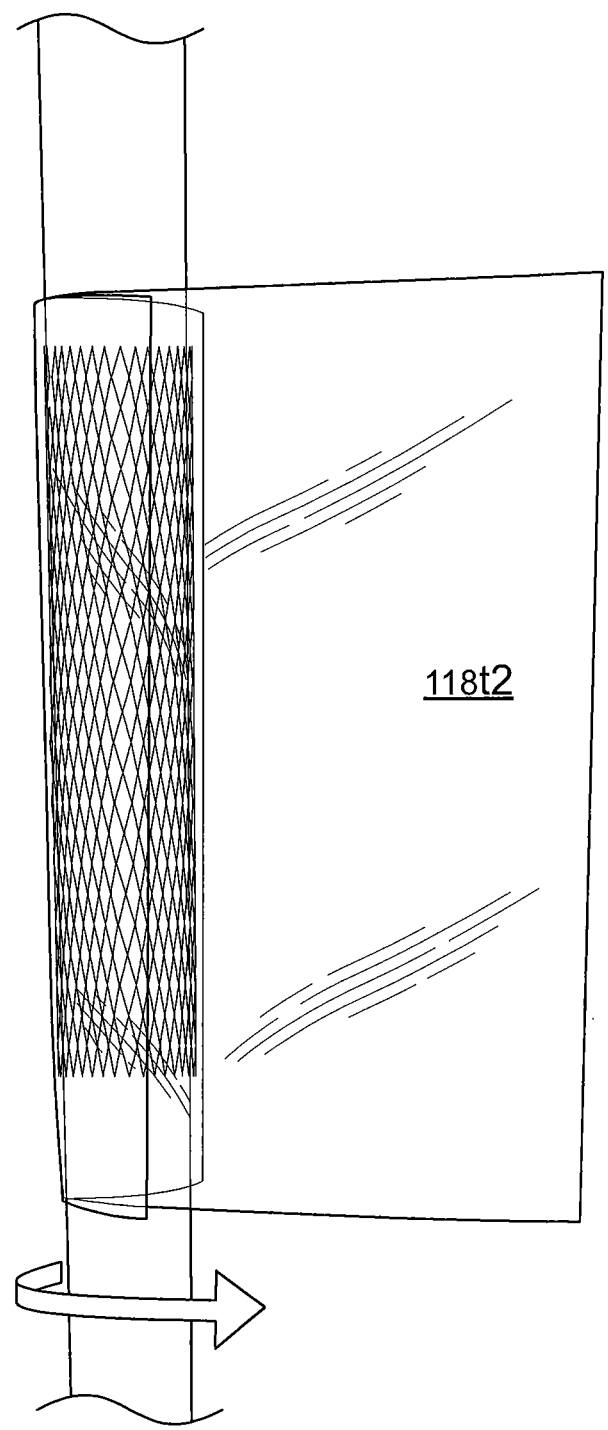
Figure 12:
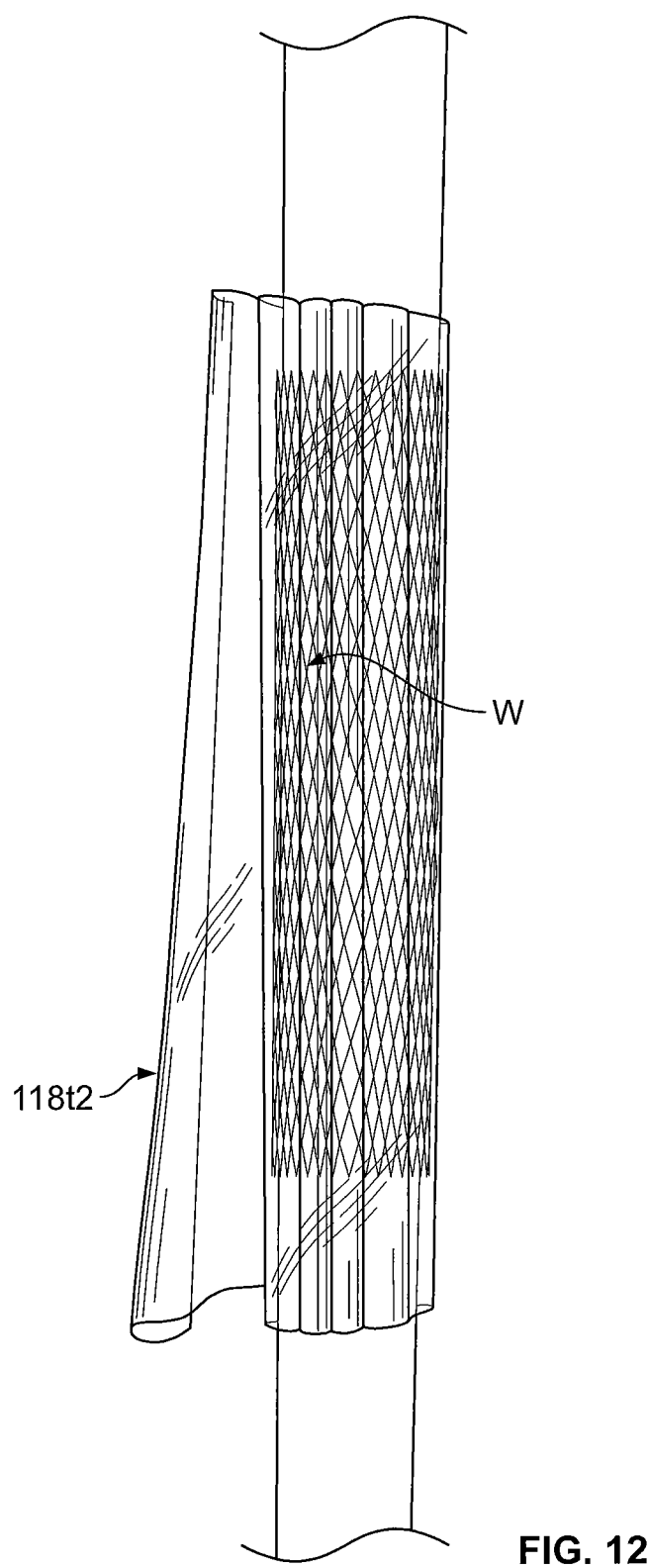

According to some embodiments, the flexible tube 118*t* corresponds to the friction reducing layer 118. More than one of the flexible tubes 118*t* may be used. For example, according to some embodiments, the flexible tube 118*t* described above is a first flexible tube 118*t*1 and a second flexible tube 118*t*2 is positioned and wrapped around the first flexible tube 118*t*1 in a similar manner to that described in reference to FIGS. 8-10. The second flexible tube 118*t*2 may be the same or substantially the same as the first flexible tube 118*t*1. In such embodiments, the first and second flexible tubes 118*t*1, 118*t*2 form the first friction reducing layer 118. This is illustrated in FIGS. 11 and 12. According to some other embodiments, more than two of the flexible tubes 118*t* may be wrapped to form the first friction reducing layer 118. The wrapping of the flexible tube(s) and/or the use of multiple flexible tubes may provide a more robust friction reducing surface (and may provide a friction reducing layer that has additional wrinkles).

Figure 13:
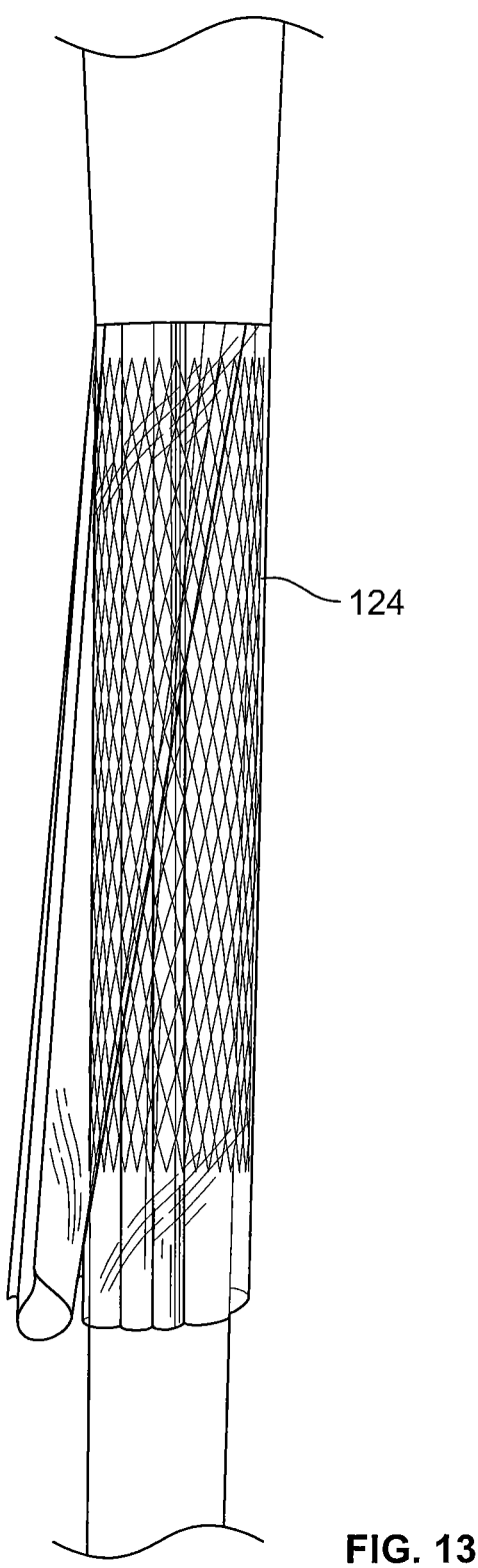

Referring to FIG. 13, grease may be applied to the outermost of the flexible tubes 118*t*. The grease corresponds to the first lubrication layer 124.

Figure 14:
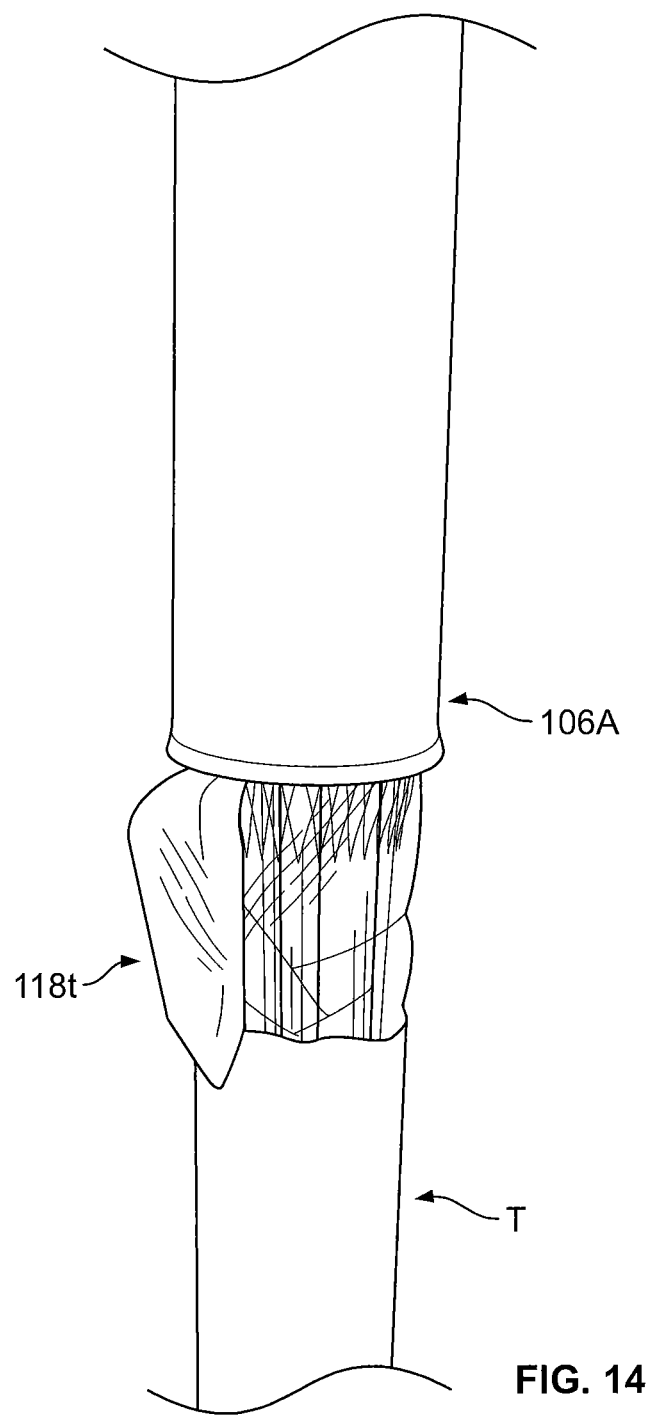

Referring to FIG. 14, the tube T may be grasped at the first end 106A thereof and flipped down over the flexible tube(s) 118*t*. In this regard, an outer surface of the tube T faces the flexible tube(s) 118*t*. As shown in FIG. 14, after the tube T is flipped down, an end of the flexible tubes(s) 118*t* extends past the first end 106A of the tube T. This may help ensure that the outer sleeve 104 does not contact itself during the later unrolling of the cover assembly 100 (e.g., to avoid rubber-to-rubber contact). In particular, referring to FIG. 1, the friction reducing layer 118 extends past the first end 106A of the outer sleeve 104 to help ensure that the first outer section 110A of the outer sleeve 104 does not contact the intermediate section 112 of the outer sleeve 104 during unrolling.

Figure 15:
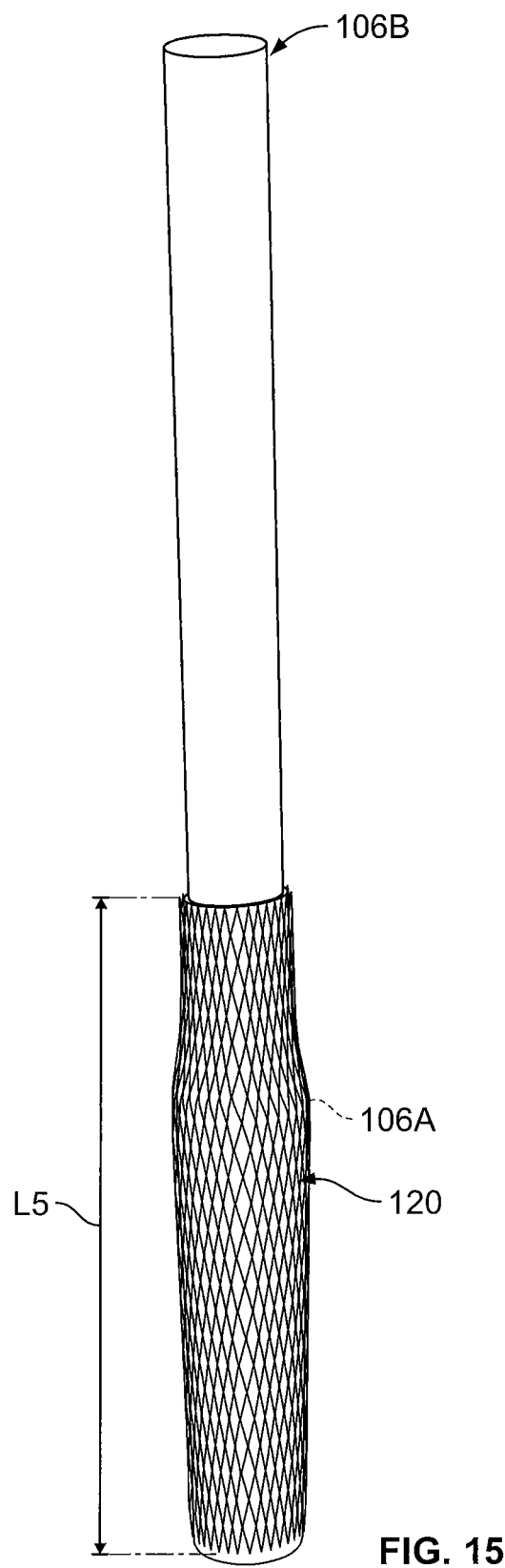

Referring to FIG. 15, the mandrel may be turned upside-down and re-clamped in the bench vise. A mesh tube 120 corresponding to the second retention layer 120 is positioned around the tube T at the mark M2 and extends over the first end 106A of the tube T. The mesh tube 120 may be longer than the mesh tube 116. The mesh tube may have a length L5 of between about 50 and 400 mm and, in some embodiments, has a length L5 of about 230 mm.

Figure 16:
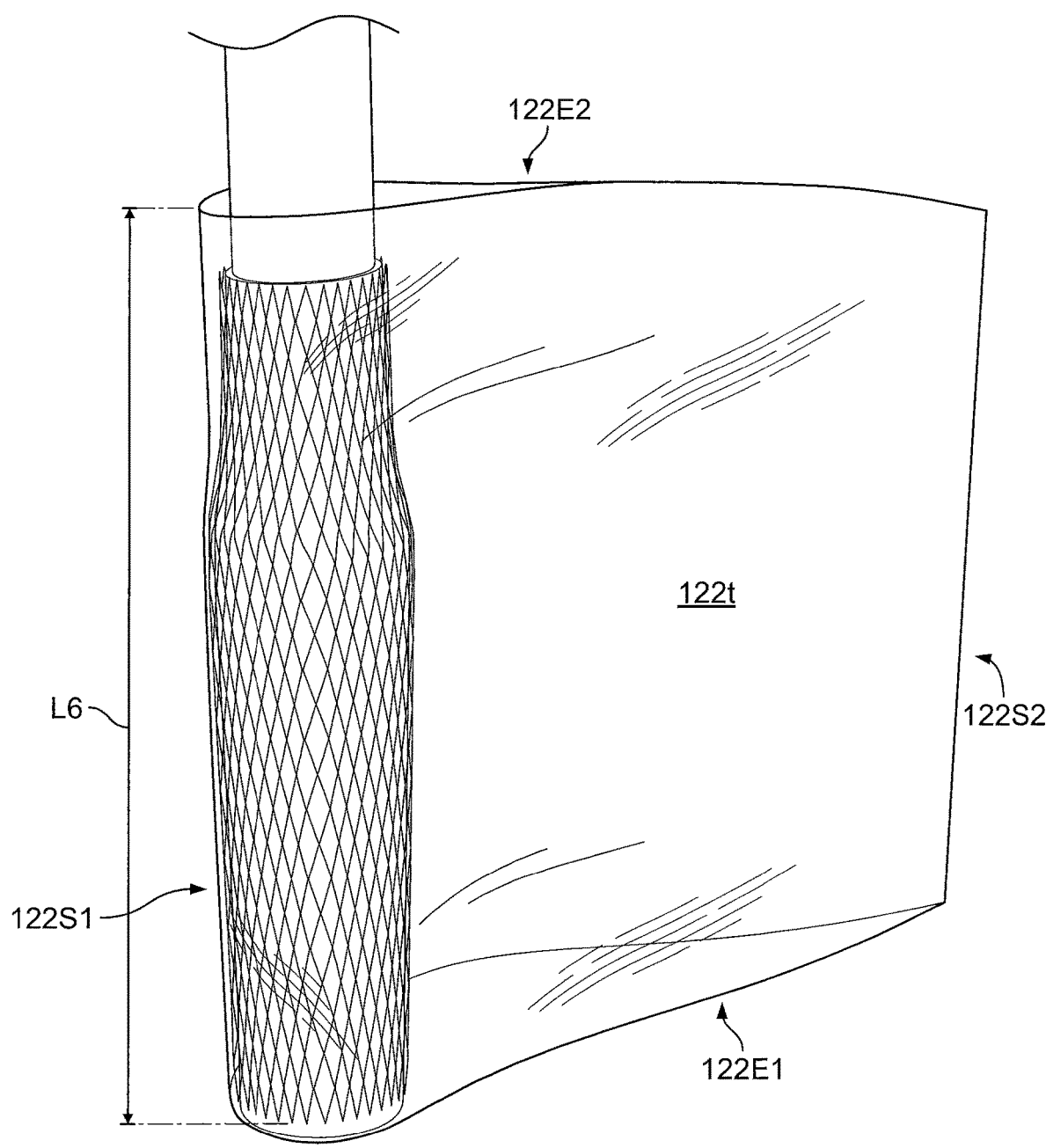
Figure 17:
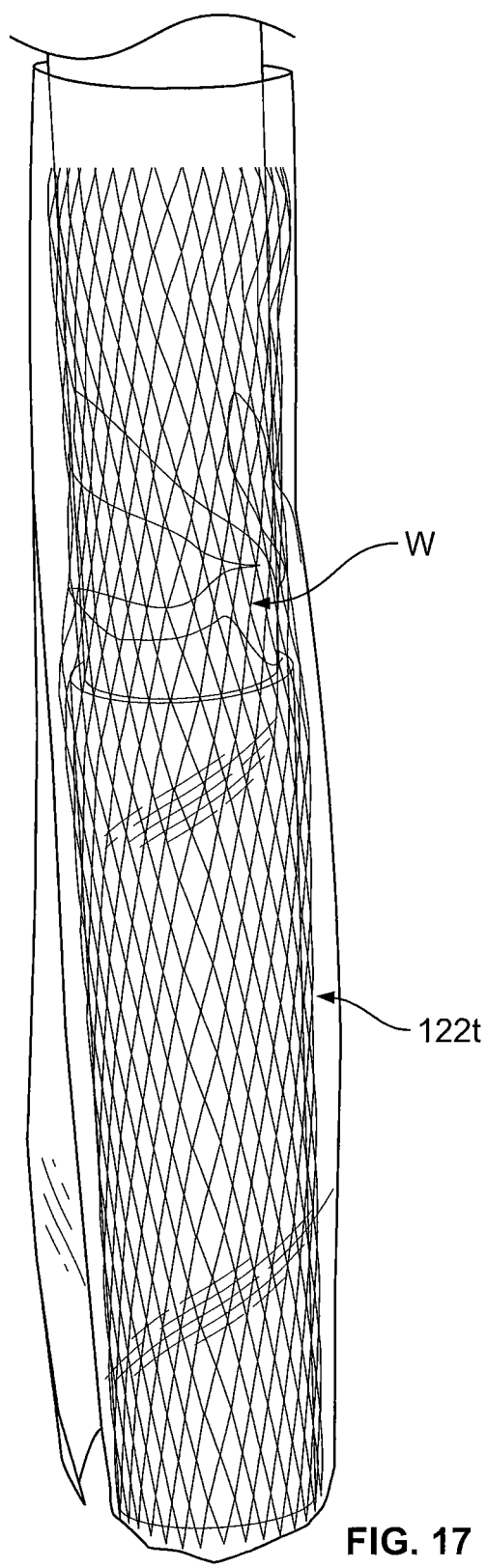

Referring to FIGS. 16 and 17, a flexible tube 122*t* includes first and second opposite open ends 122E1, 122E2 and first and second opposite closed sides 122S1, 122S2. The flexible tube 122*t* is received over and wrapped around the tube T and the mesh tube 120 in the same way as described above in reference to the flexible tube 118*t*. According to some embodiments, the flexible tube 122*t* is a first flexible tube and a second flexible tube 122*t* is wrapped around the first flexible tube. According to some embodiments, more than two flexible tubes may be sequentially wrapped. The flexible tube(s) 122*t* form the second friction reducing layer 122. Wrinkles W may be in the second friction reducing layer 122.

The flexible tube 122*t* may be substantially similar to the flexible tube 118*t* but may have a greater length. The flexible tube 122*t* may have a length L6 of between about 50 and 400 mm and, in some embodiments, has a length L6 of about 230 mm.

Figure 18:
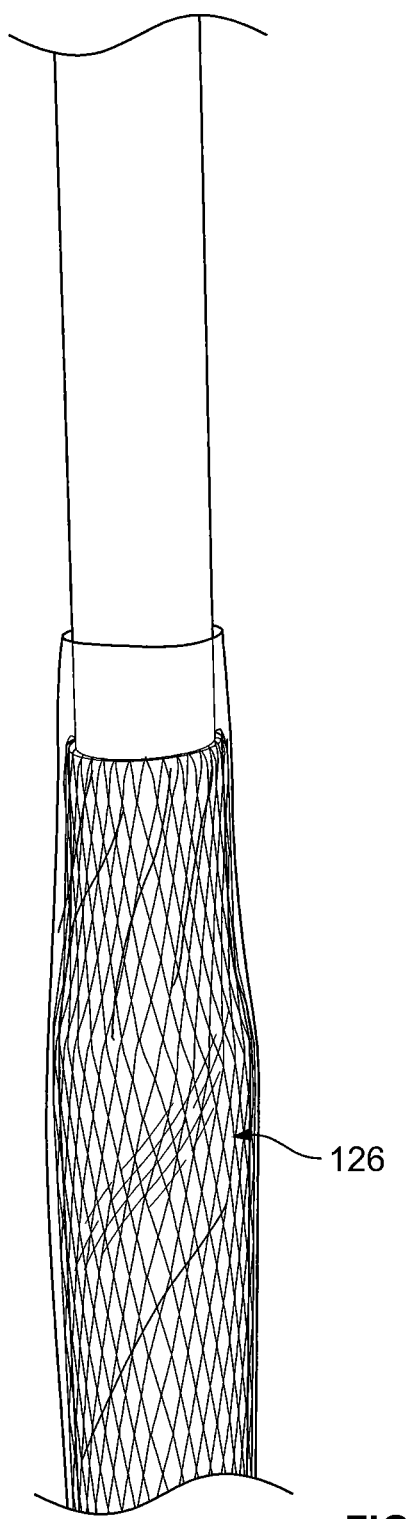

Grease may then be applied to the outermost flexible tube 122*t* as shown in FIG. 18. The applied grease may form the second lubrication layer 126.

Figure 19:
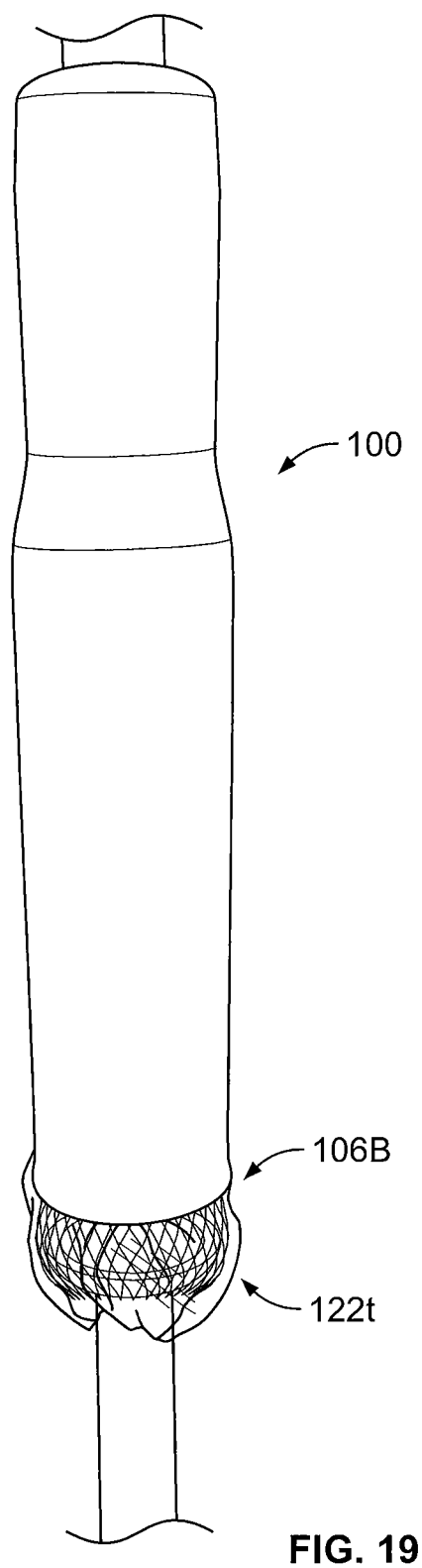

Referring to FIG. 19, the second end 106B of the tube T may be flipped down to form the completed cover assembly 100. As shown in FIG. 19, after the tube T is flipped down, an end of the flexible tubes(s) 122*t* extends past the second end 106B of the tube T. This may help ensure that the outer sleeve 104 does not contact itself during the later unrolling of the cover assembly 100 (e.g., to avoid rubber-to-rubber contact). In particular, referring to FIG. 1, the friction reducing layer 122 extends past the second end 106B of the outer sleeve 104 to help ensure that the second outer section 110B of the outer sleeve 104 does not contact the first outer section 110A of the outer sleeve during unrolling.

Figure 20:
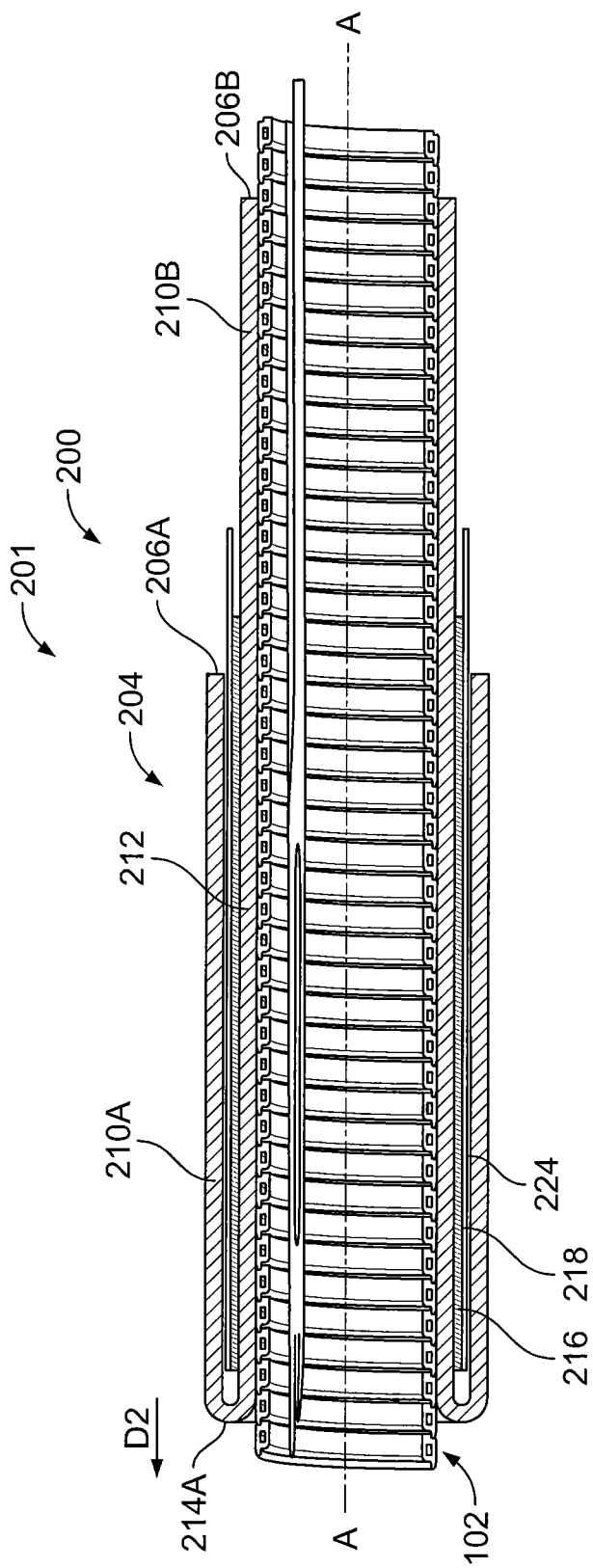
FIG. 20 is a cross-sectional view of a pre-expanded cover assembly unit including a cover assembly and a holdout device according to some other embodiments of the present invention.

A cover assembly 200 according to some other embodiments of the present invention is shown in FIG. 20.

The cover assembly 200 is similar to the cover assembly 100 with the primary differences being described below. The cover assembly 200 includes one, rather than two, outer sections that can be unrolled. The cover assembly 200 may used to cover cables at or adjacent cable terminations, for example. The cover assembly 200 may be provided as a pre-expanded cover assembly unit 201 including a holdout device 102, as shown in FIG. 20, wherein the cover assembly 200 is in an expanded state or position.

The cover assembly 200 includes an outer sleeve 204. The outer sleeve 204 includes first and second opposite ends 206A, 206B. The outer sleeve 204 includes a first outer section 210A that is folded back on an intermediate section 212 and/or a second outer section 210B of the outer sleeve 204 at annular fold 214A.

A retention layer 216 is between the first outer section 210A of the sleeve 204 and the intermediate section 212 and/or the second outer section 210B of the sleeve 204. The retention layer 216 may be the same or substantially the same as the retention layer 116 described above. A friction reducing layer 218 is between the retention layer 216 and the intermediate section 212 and/or the second outer section 210B of the sleeve 204. The friction reducing layer 218 may be the same or substantially the same as the friction reducing layer 118 described above. The friction reducing layer 218 may extend axially past the first end 206A of the sleeve 204. According to some embodiments, a lubrication layer 224 is between the friction reducing layer 218 and the intermediate section 212 and/or the second outer section 210B of the sleeve 204. The lubrication layer 224 may be the same or substantially the same as the lubrication layer 124 described above.

It will be appreciated that such a configuration allows for easier unrolling of the first outer section 210A of the sleeve 204 in the direction D2 for substantially the same reasons as described above in reference to the cover assembly 100.

The cover assembly 200 may be assembled in a similar way to that shown in FIGS. 8-14. The tube T may be shorter than as shown in FIGS. 8-14.

Figure 21:
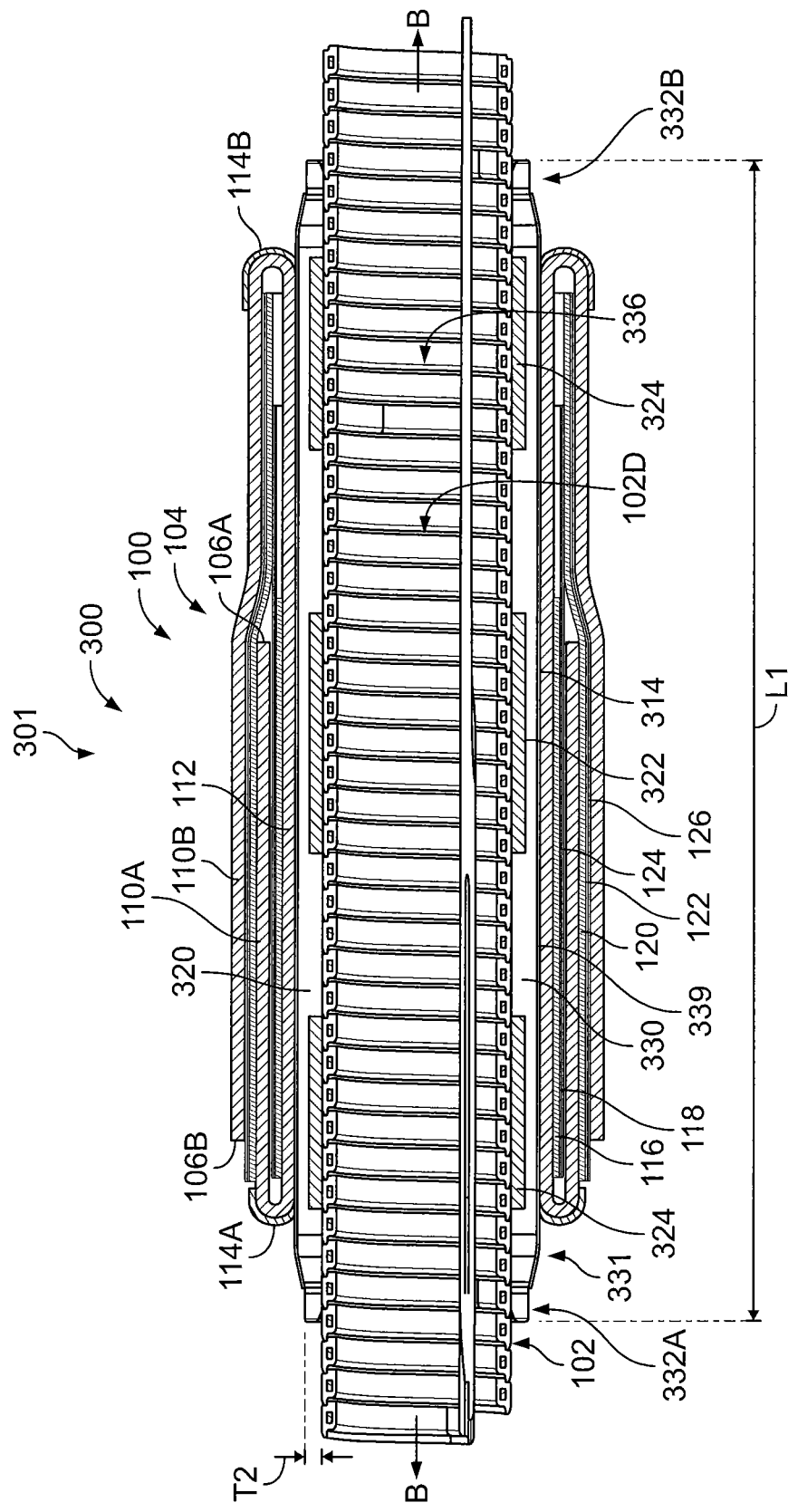
FIG. 21 is a cross-sectional view of a pre-expanded cover assembly unit including a cover assembly and a holdout device according to some other embodiments of the present invention.

A cover assembly 300 according to some other embodiments of the present invention is shown in FIG. 21.

The cover assembly 300 may be used to cover and electrically insulate electrical substrates such as cables and connectors. The cover assembly 300 may be provided as a pre-expanded cover assembly unit 301 including a holdout device 102, as shown in FIG. 21, wherein the cover assembly 300 is in an expanded state or position. The cover assembly 300 may be deployed and mounted on the intended substrate in a retracted state or position in a similar manner as described above in reference to the cover assembly 100. According to some embodiments, the cover assembly 300 is a cold shrink cover, meaning that it can be shrunk or retracted about the substrate without requiring the use of applied heat.

The cover assembly 300 provides an "all-in-one" integral unit that can be installed in similar fashion to known cold shrink splice cover insulating tubes. The cover assembly 300 includes the cover assembly 100 and therefore shares the associated advantages described above.

The cover assembly 300 includes the cover assembly 100, a metal contact layer 314, a Faraday cage layer 322, two stress cone layers 324, an inner sleeve (or insulation body) 330, and a semiconductor layer 339, as discussed in more detail below. In some embodiments, the Faraday cage layer 322, the stress cone layers 324, and the inner sleeve 330 are bonded (e.g., adhered or molded) together to form a unitary component in the form of an inner sleeve assembly 331.

The cover assembly 300 may be used to cover and seal a connection or splice between two or more cables 40, 50 including a connector 60 to form a connection assembly 10, similar to as shown in FIGS. 3-7.

Referring to FIG. 21, the cover assembly 300 has a lengthwise axis B-B. The Faraday cage layer 322, the stress cone layers 324, the inner sleeve 330, and the semiconductor layer 339 are provided as an integral, unitary structure extending lengthwise along the axis B-B. According to some embodiments, the cover assembly 300 is provided pre-installed and pre-expanded on the holdout 102.

The inner sleeve 330 has opposed ends 332A, 332B. The inner sleeve 330 is tubular and defines an axially extending conductor through passage 336

The Faraday cage layer 322 is illustrated as a generally tubular sleeve bonded to the inner surface 320 of the inner sleeve 330. The Faraday cage layer 322 may be formed of a suitable elastically conductive elastomer. In use, the Faraday cage layer 322 may form a Faraday cage to provide an equal potential volume about the connector 60 so that an electric field is cancelled in the surrounding air voids.

The stress cone layers 324 are illustrated as generally tubular sleeves bonded to the inner surface 330A of the inner sleeve 330 at either end 332A, 332B thereof. The stress cone layers 324 may be formed of a suitable electrically conductive elastomer. In use, the stress cone layers 324 may serve to redistribute the voltage along the surface of the cable insulation 44, 54 to reduce or prevent the degradation of the insulation 44, 54 that might otherwise occur.

According to some embodiments, the layers 322, 324 are formed of a material having a Modulus at 100 percent elongation (M100) in the range of from about 0.68 to 0.88 MPa.

The semiconductor layer 339 fully circumferentially surrounds the inner sleeve 330. According to some embodiments, the semiconductor layer 339 is coextensive with the inner sleeve 330.

The metal contact layer 314 is an electrically conductive, tubular sleeve surrounding and contacting the semiconductor layer 339. In some embodiments, the metal contact layer 314 is a copper mesh wrap or sock. In some embodiments, and as illustrated, the metal contact layer 314 extends around and contacts the first annular fold 114A of the outer sleeve 104, the first outer section 110A of the outer sleeve 104, the second annular fold 114B of the outer sleeve 104, and the second outer section 110B of the outer sleeve 104.

The semiconductor layer 339 can be formed of any suitable electrically semiconductive material. According to some embodiments, the semiconductor layer 339 is formed of an elastically expandable material. According to some embodiments, the semiconductor layer 339 is formed of an elastomeric material. According to some embodiments, the semiconductor layer 339 is formed of carbon black and silicone. Other suitable materials may include carbon black and EPDM.

The inner sleeve 330 can be formed of any suitable material. According to some embodiments, the inner sleeve 330 is formed of a dielectric or electrically insulative material. According to some embodiments, the inner sleeve 330 is formed of an elastically expandable material. According to some embodiments, the inner sleeve 330 is formed of an elastomeric material. According to some embodiments, the inner sleeve 330 is formed of liquid silicone rubber (LSR). Other suitable materials may include EPDM or ethylene propylene rubber (EPR). According to some embodiments, the inner sleeve 330 has a Modulus at 100 percent elongation (M100) in the range of from about 0.4 to 0.52 MPa.

According to some embodiments, the thickness T2 of the inner sleeve 330 is in the range from about 0.07 to 2 inches. According to some embodiments, the length L1 of the inner sleeve 330 is in the range from about 8 to 30 inches.

The holdout device 102 may be factory installed. The holdout 102 can be formed of any suitable material. According to some embodiments, the holdout 102 is formed of a semi-rigid or rigid plastic. In some embodiments, the holdout 102 is formed of polypropylene, PVC or ABS.

The cover assembly 300 may be formed by any suitable method and apparatus. According to some embodiments, the inner sleeve 330 is molded and the outer sleeve 104 is thereafter insert overmolded about the inner sleeve 330.

According to further embodiments, the inner sleeve 330 and the outer sleeve 104 are separately formed (for example, by molding or extrusion) and thereafter the outer sleeve 104 is mounted on the inner sleeve 330.

According to some embodiments, the inner sleeve 330 is unitarily molded. According to some embodiments, the outer sleeve 104 is unitarily molded. Alternatively, the inner sleeve 330 and/or the outer sleeve 104 may be extruded. According to some embodiments, the inner sleeve 330 and/or the outer sleeve 104 is unitarily extruded.

The pre-expanded unit 301 may be used in the manner described above in connection with FIGS. 3-7 to apply the cover 300 over a splice connection 15 (FIG. 4) between a pair of electrical power transmission cables 40, 50 to form a connection assembly. Specifically, the pre-expanded unit 301 may be slid into position over the connector 60 similar to the pre-expanded unit 101 in FIG. 5. The holdout 102 is then removed from the cover assembly 300, thereby permitting the elastomeric sleeves 330, 104 to relax and radially retract about the cables 40, 50 and the connector 60. According to some embodiments, the inner sleeve 330 overlaps and engages the semiconductor layers 44, 54 of the cables 40, 50.

The holdout 102 is removed in the same or similar manner as described above in reference to the pre-expanded unit 101. This in turn permits the inner sleeve 330 and the outer sleeve 104 to contract radially inwardly.

The operator then rolls (slides) each of the extension sections 110A, 110B of the outer sleeve 104 axially outwardly to cover the adjacent sections of the cables 40 and 50, respectively. As described above, the cover assembly 100 including the first and second friction reducing layers 118, 122 facilitates easier unrolling (sliding) of the outer sections 110A, 110B of the outer sleeve 104 axially outwardly.

Cover assemblies according to some embodiments of the present invention may include additional layers and/or certain layers may be omitted. For example, cover assemblies in accordance with some embodiments of the present invention may be formed without the semiconductor layer 139. One or more additional layers may be interposed between the inner sleeve 130 and the outer sleeve 140.

Cover assemblies according to embodiments of the invention may be used for all cold shrinkable products that require the field installer to unroll the EPDM jacket such as Cold Shrink Joints (CSJ) and Cold Applied Transition Joints (CATJ). Cover assemblies according to embodiments of the invention may be used for any suitable cables and connections. Such cable assemblies may be adapted for use, for example, with connections of medium voltage cables up to about 46 kV. In some applications, the cover assemblies are installed on underground residential distribution (URD) cable splices.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An integral, unitary pre-expanded cover assembly unit for covering an electrical connection between first and second electrical cables each having a primary conductor, the pre-expanded cover assembly unit comprising:
   a cover assembly in a folded position or state including:
      an elastomeric outer sleeve defining a cable passage to receive the electrical connection and the primary conductors of the first and second cables, the outer sleeve comprising an intermediate section and first and second outer sections, wherein the first outer section is folded at a first annular fold and is on the intermediate section, and wherein the second outer section is folded at a second annular fold and is on the first end outer section;
      a first retention layer between the intermediate section and the first outer section of the outer sleeve;
      a first friction reducing layer between the first retention layer and the first outer section of the outer sleeve;
      a second retention layer between the first outer section and the second outer section of the outer sleeve; and
      a second friction reducing layer between the second retention layer and the second outer section of the outer sleeve; and
   a removable holdout mounted within the outer sleeve, wherein the holdout is operative to temporarily maintain the outer sleeve in an expanded state;
   wherein:
      the cover assembly is movable from the folded position or state to an unfolded position or state by sliding the second outer section of the outer sleeve in a first axial direction away from the intermediate section of the outer sleeve and by sliding the first outer section of the outer sleeve in a second, opposite axial direction away from the intermediate section of the outer sleeve.

2. The pre-expanded cover assembly unit of claim 1 wherein the holdout includes a tubular holdout body formed from a helically wound strip, and the holdout is removable from the outer sleeve by pulling the strip.

3. The pre-expanded cover assembly unit of claim 1 wherein the outer sleeve is formed of ethylene propylene diene monomer (EPDM) rubber.

4. The pre-expanded cover assembly unit of claim 1 wherein each of the first and second retention layers comprise a vinyl mesh.

5. The pre-expanded cover assembly unit of claim 1 wherein each of the first and second friction reducing layers comprise polyethylene.

6. The pre-expanded cover assembly unit of claim 5 wherein each of the first and second friction reducing layers comprise a plurality of overlapping layer sections of polyethylene.

7. The pre-expanded cover assembly unit of claim 6 wherein the first and second friction reducing layers comprise a polyethylene tube that is wrapped around the first and second retention layers, respectively, a plurality of times.

8. The pre-expanded cover assembly unit of claim 7 wherein at least some of the plurality of overlapping layer sections of polyethylene of each of the first and second friction reducing layers comprise wrinkles.

9. The pre-expanded cover assembly unit of claim 1 wherein:

a coefficient of friction between the first friction reducing layer and the first retention layer is less than a coefficient of friction between the first retention layer and the outer sleeve; and a coefficient of friction between the second friction reducing layer and the second retention layer is less than a coefficient of friction between the second retention layer and the outer sleeve.

10. The pre-expanded cover assembly unit of claim 1 further comprising:
    a first lubrication layer comprising grease between the first friction reducing layer and the first outer section of the outer sleeve; and
    a second lubrication layer comprising grease between the second friction reducing layer and the second outer section of the outer sleeve.

11. The pre-expanded cover assembly unit of claim 1 wherein:
    the first outer section of the outer sleeve comprises a first end;
    the second outer section of the outer sleeve comprises a second end;
    the first friction reducing layer and/or the first retention layer extends past the first end of the first outer section of the outer sleeve in the first axial direction toward the second annular fold; and
    the second friction reducing layer and/or the second retention layer extends past the second end of the second outer section in the second axial direction toward the first annular fold.

12. The pre-expanded cover assembly unit of claim 1 wherein:
    the cover assembly includes an elastomeric inner sleeve defining the cable passage with the outer sleeve surrounding the inner sleeve;
    the holdout is operative to temporarily maintain the outer sleeve in an expanded state and the inner sleeve in an expanded state;
    the cover assembly includes a Faraday cage sleeve mounted within the inner sleeve and formed of an electrically conductive elastomer;
    the cover assembly includes a stress cone sleeve mounted within the inner sleeve proximate an end thereof, wherein the stress cone sleeve is formed of an electrically conductive elastomer; and
    the cover assembly includes a semiconductor layer mounted on an outer side of the inner sleeve.

13. The pre-expanded cover assembly unit of claim 1 wherein the cover assembly is a cold shrinkable cover assembly.

14. A method for covering an electrical connection between first and second electrical cables each having a primary conductor, the method comprising:
    providing an integral, unitary pre-expanded cover assembly unit comprising:
        a cover assembly in a folded position or state comprising:
            an elastomeric outer sleeve defining a cable passage to receive the electrical connection and the primary conductors of the first and second cables, the outer sleeve comprising an intermediate section and first and second outer sections, wherein the first outer section is folded at a first annular fold and is on the intermediate section and wherein the second outer section is folded at a second annular fold and is on the first outer section;
            a first retention layer between the intermediate section and the first outer section of the outer sleeve;
            a first friction reducing layer between the first retention layer and the first outer section of the outer sleeve;
            a second retention layer between the first outer section and the second outer section of the outer sleeve;
            a second friction reducing layer between the second retention layer and the second outer section of the outer sleeve; and
        a removable holdout mounted within the outer sleeve, wherein the holdout is operative to temporarily maintain the outer sleeve in an expanded state;
    receiving the cover assembly unit around the electrical connection;
    removing the holdout from the outer sleeve;
    sliding the first outer section of the outer sleeve in a first axial direction away from the intermediate section of the outer sleeve and onto the first cable and/or the cable connection; and
    sliding the second outer section of the outer sleeve in a second axial direction away from the intermediate section of the outer sleeve and onto the second cable and/or the cable connection, the second axial direction opposite the first axial direction.

15. An integral, unitary pre-expanded cover assembly unit for covering an electrical connection between first and second electrical cables each having a primary conductor, the pre-expanded cover assembly unit comprising:
    a cover assembly in a folded position or state comprising:
        an elastomeric outer sleeve defining a cable passage to receive the electrical connection and the primary conductors of the first and second cables, the outer sleeve comprising an intermediate section and first and second outer sections, wherein the first outer section is folded at a first annular fold and is on the intermediate section and/or the second outer section;
        a first retention layer between the intermediate section and the first outer section of the outer sleeve; and
        a first friction reducing layer between the first retention layer and the first outer section of the outer sleeve; and
    a removable holdout mounted within the outer sleeve, wherein the holdout is operative to temporarily maintain the outer sleeve in an expanded state;
    wherein:
        the cover assembly is movable from the folded position or state to an unfolded position or state by sliding the first outer section of the outer sleeve in a first axial direction away from the intermediate section of the outer sleeve.

16. The pre-expanded cover assembly unit of claim 15 wherein:
    the outer sleeve is formed of ethylene propylene diene monomer (EPDM) rubber;
    the first retention layer comprises a vinyl mesh; and
    the first friction reducing layer comprises polyethylene.

17. The pre-expanded cover assembly unit of claim 15 wherein the first friction reducing layer comprises a plurality of overlapping layer sections of friction reducing material.

18. The pre-expanded cover assembly unit of claim 17 wherein at least some of the plurality of overlapping layer sections of friction reducing material of the first friction reducing layer comprise wrinkles.

19. The pre-expanded cover assembly unit of claim 15 wherein:

a coefficient of friction between the first friction reducing layer and the first retention layer is less than a coefficient of friction between the first retention layer and the outer sleeve.

20. The pre-expanded cover assembly unit of claim 15 further comprising a first lubrication layer comprising grease between the first friction reducing layer and the first outer section of the outer sleeve.

21. The pre-expanded cover assembly unit of claim 15 wherein:
   the first outer section of the outer sleeve comprises a first end;
   the first retention layer and/or the first friction reducing layer extends axially past the first end in a second axial direction that is opposite the first axial direction.

22. The pre-expanded cover assembly unit of claim 15 wherein:
   a coefficient of friction between the first friction reducing layer and the first retention layer is less than a coefficient of friction between the first retention layer and the outer sleeve; and
   a coefficient of friction between the first retention layer and the outer sleeve is less than a coefficient of friction between overlapping layers of the outer sleeve.

\* \* \* \* \*